(12) United States Patent
Sahita

(10) Patent No.: US 7,443,854 B2
(45) Date of Patent: Oct. 28, 2008

(54) METHODS AND APPARATUS TO ROUTE PACKETS IN A POLICY DRIVEN NETWORKED ENVIRONMENT

(75) Inventor: Ravi L. Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 10/405,712

(22) Filed: Apr. 2, 2003

(65) Prior Publication Data

US 2004/0196839 A1    Oct. 7, 2004

(51) Int. Cl.
*H04L 12/28* (2006.01)
(52) U.S. Cl. .................. 370/392; 370/401
(58) Field of Classification Search ........ None
See application file for complete search history.

(56) References Cited

U.S. PATENT DOCUMENTS 6,539,369 B2 *   3/2003   Brown ................... 707/1
6,788,695 B1 *   9/2004   Nagasawa ............. 370/408
2004/0052251 A1 *   3/2004   Mehrotra et al. ..... 370/389

OTHER PUBLICATIONS

T.V. Lakshman et al. "High-Speed Policy-based Packet Forwarding Using Efficient Multi-dimensional Range Matching." SIGCOMM: ACM Special Interest Group On Data Communication, 1998. pp. 203-214.

* cited by examiner

*Primary Examiner*—Chau Nguyen
*Assistant Examiner*—Dargaye H Churnet
(74) *Attorney, Agent, or Firm*—Hanley, Flight & Zimmerman, LLC

(57) ABSTRACT

Methods and apparatus to route packets in a networked environment are disclosed. In an example method, a first property value associated with a first property and a second property value associated with a second property are identified from the packet of information to be routed. A first binary tree associated with the first property is searched to retrieve a first bit vector associated with the first property value, and a second binary tree associated with the second property is searched to retrieve a second bit vector associated with the second property value. A routing policy may be identified based on the first and second bit vectors.

23 Claims, 22 Drawing Sheets

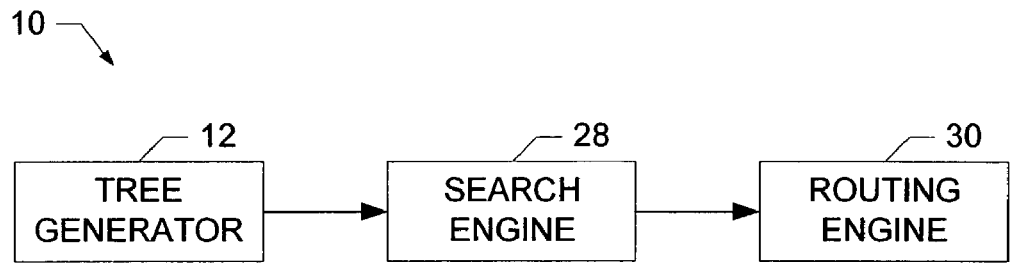
FIG. 1
| | PROPERTY R1 | PROPERTY R2 |
|---|---|---|
| P1 | 10-20 | 10-15 |
| P2 | 11-19 | 12 |
| P3 | 5-15 | * |
| P4 | 1-10 | 1-9 |
| P5 | 3 | * |
FIG. 2
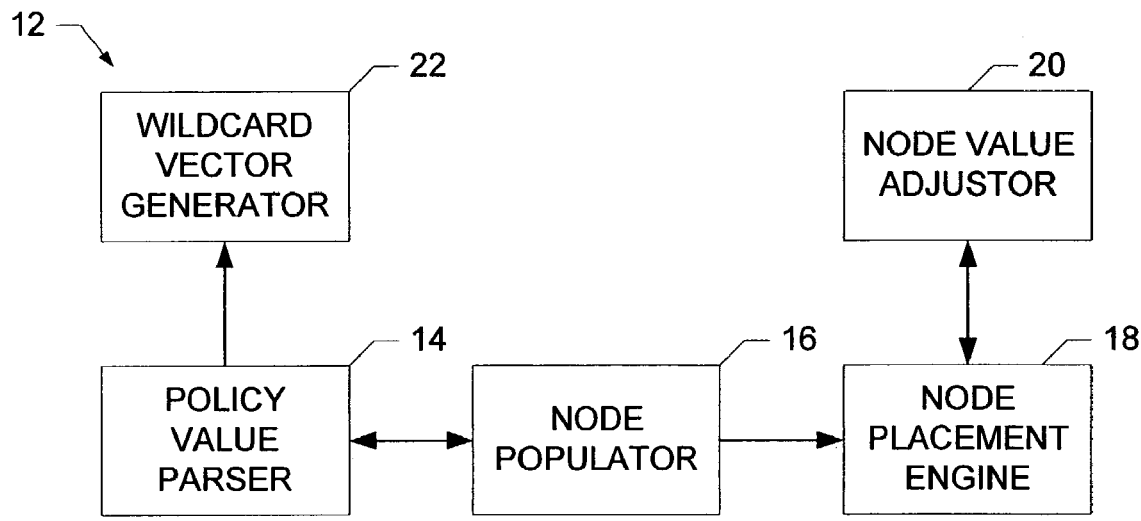
FIG. 3

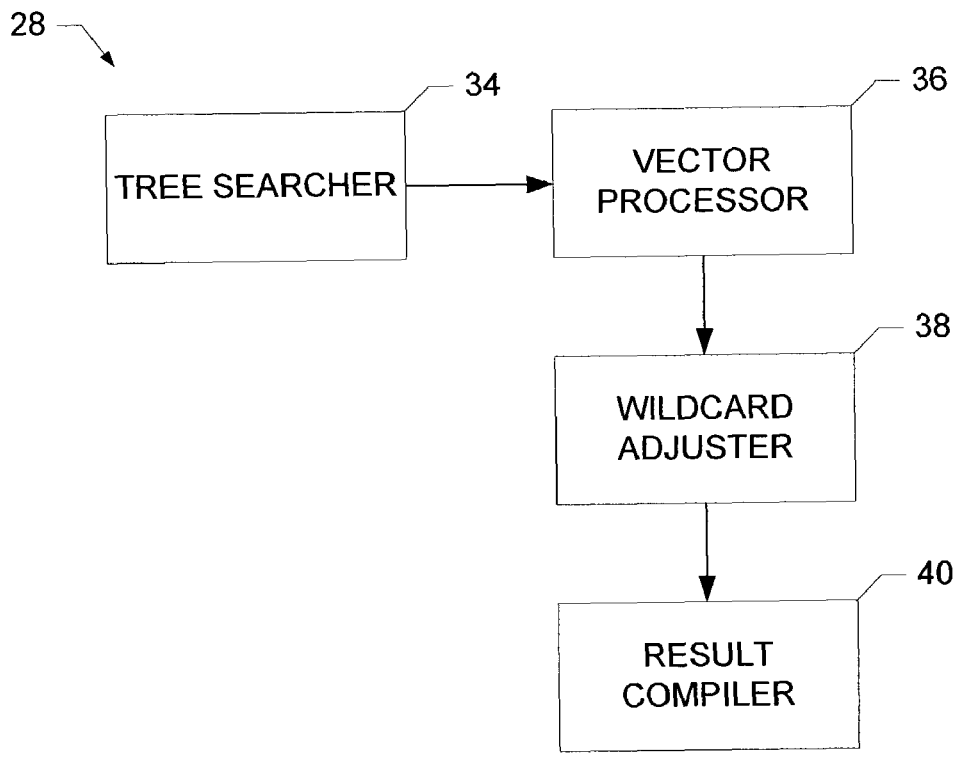
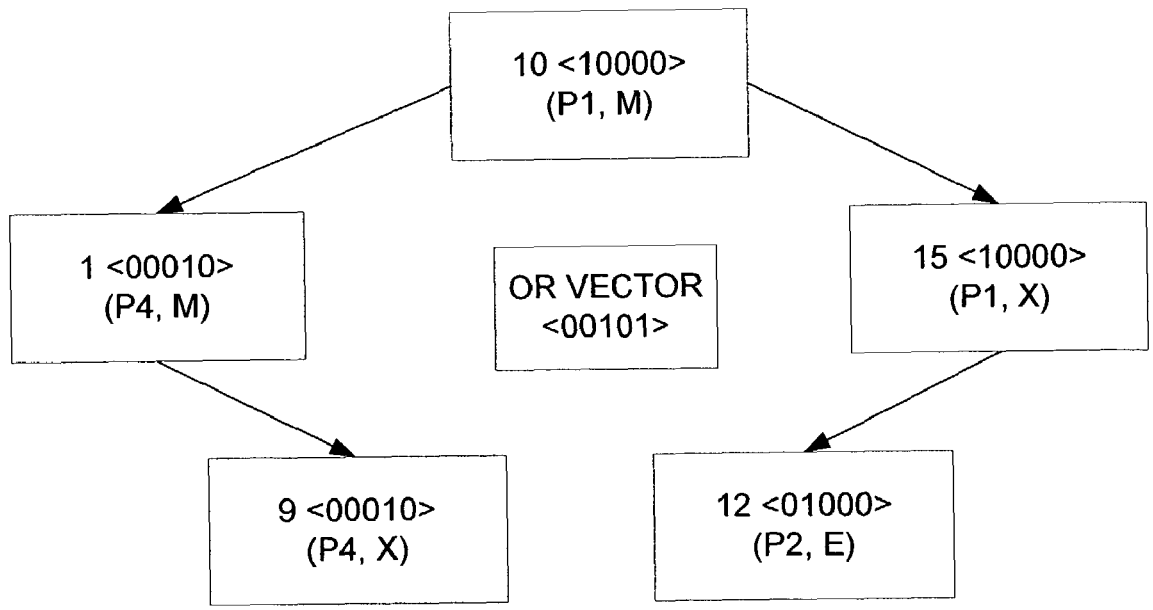

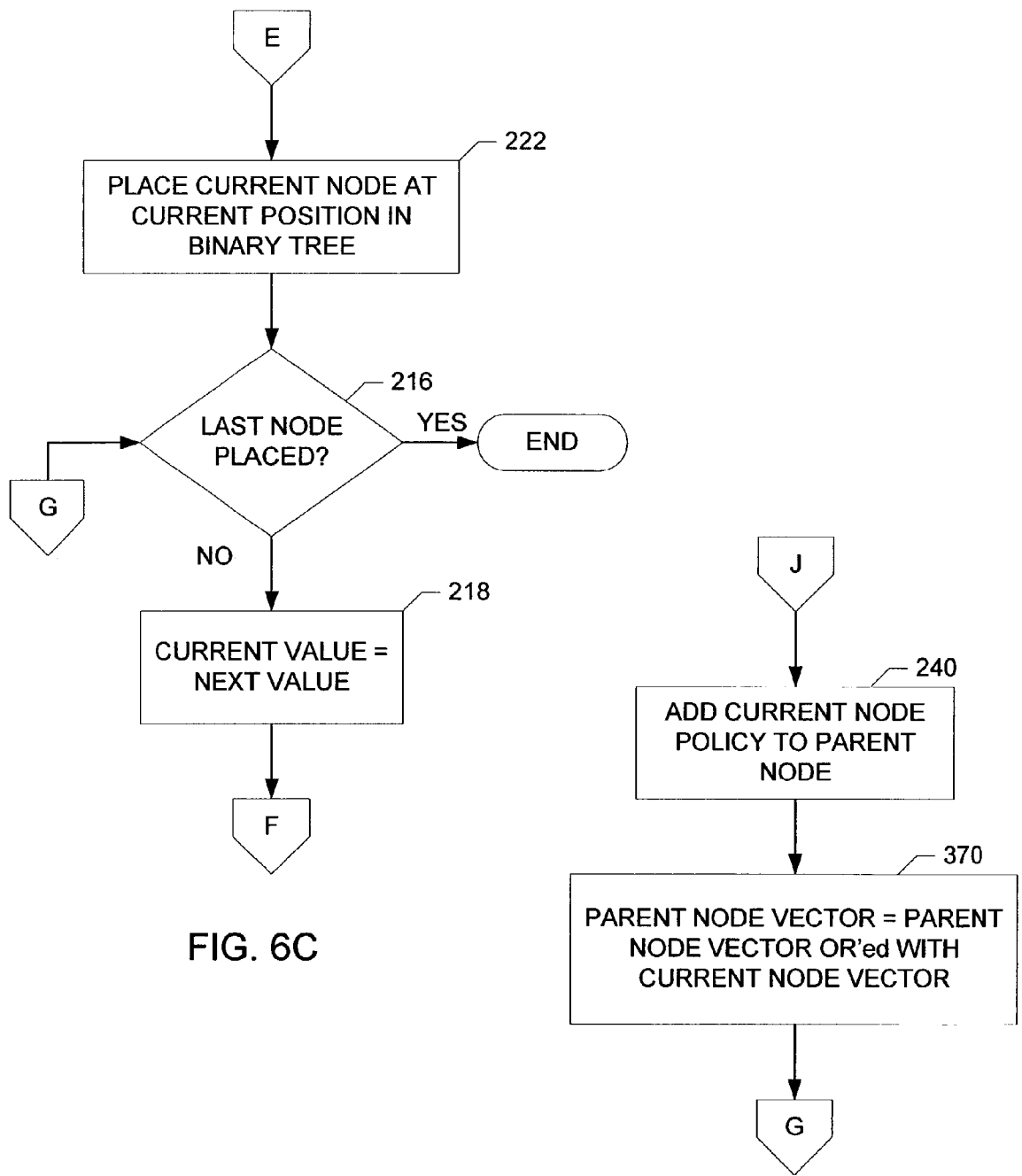

PROPERTY R1

METHODS AND APPARATUS TO ROUTE PACKETS IN A POLICY DRIVEN NETWORKED ENVIRONMENT

FIELD OF THE DISCLOSURE

This disclosure relates generally to computer networks, and, more particularly, to methods and apparatus to route packets in a policy driven networked environment.

BACKGROUND

It is often desirable to control data traffic flow in a networked environment. For example, for some applications, it is desirable or necessary to guarantee a desired transmission rate or error rate. To make such Quality of Service (QoS) commitments possible in public networks such as the Internet, policy based network management systems have been developed. Policy based network management systems provide routers and/or gateways within the managed network with a mechanism to classify and route packets of information in accordance with predefined routing policies. In this way, certain packets may be given priority in routing from place to place to ensure QoS commitments are kept. Additionally, access limitations such as might be required to manage a virtual private network or the like may be enforced via these policy control mechanisms.

For example, in the Internet context, data is routed from point to point as a plurality of data packets. Each packet includes a header constructed pursuant to the Internet Protocol (IP). The IP header includes a number of fields specifying certain properties associated with the packet. For example, the IP header includes a source field identifying the source address for the packet, a destination field identifying the destination address of a packet, a time-to live (TTL) field specifying the maximum number of routers that may handle the packet before the packet is destroyed, etc. The information in these and other fields in the IP header may be used to determine the manner in which the associated packet is handled by a router in the network. For example, policy based network management systems use the information in the packet headers to determine which policies apply to the subject packets, and then use the applicable policies to decide where and/or whether to forward the associated data packets. To accomplish this task, policy based network management systems include packet classification units which read the packet headers to decipher the routing policies that apply to the same.

Network traffic speeds have increased in recent years. For example, traffic speeds at 10 Gbits/sec (gigabits per second) are now common. Indeed, some traffic speeds are approaching 40 Gbits/sec. Fast classification of packets becomes increasingly important in such environments, as delays in the routing policy enforcement mechanism can create large bottlenecks in the network. In fact, as traffic speeds increase, they may require classification of as many as one million packets per second (Mpps) to enforce routing policies while avoiding formation of bottlenecks.

BRIEF DESCRIPTION OF THE DRAWINGS

FIG. 1 is a schematic illustration of an example apparatus to route packets in a networked environment.

FIG. 2 is a chart illustrating an example set of relationships between an example set of routing policies and two example packet properties.

FIG. 3 is a more detailed schematic illustration of the example tree generator of FIG. 1.

FIG. 4 is a more detailed schematic illustration of the example search engine of FIG. 1.

FIGS. 6A-6J are a flowchart representing an example construct tree routine that may be called by the program of FIG. 5.

FIG. 8 is a schematic illustration of another example balanced binary tree that may be constructed with the program of FIG. 5 using the example relationships between property R2 and the policies illustrated in the example of FIG. 2.

DETAILED DESCRIPTION

Figure 5:
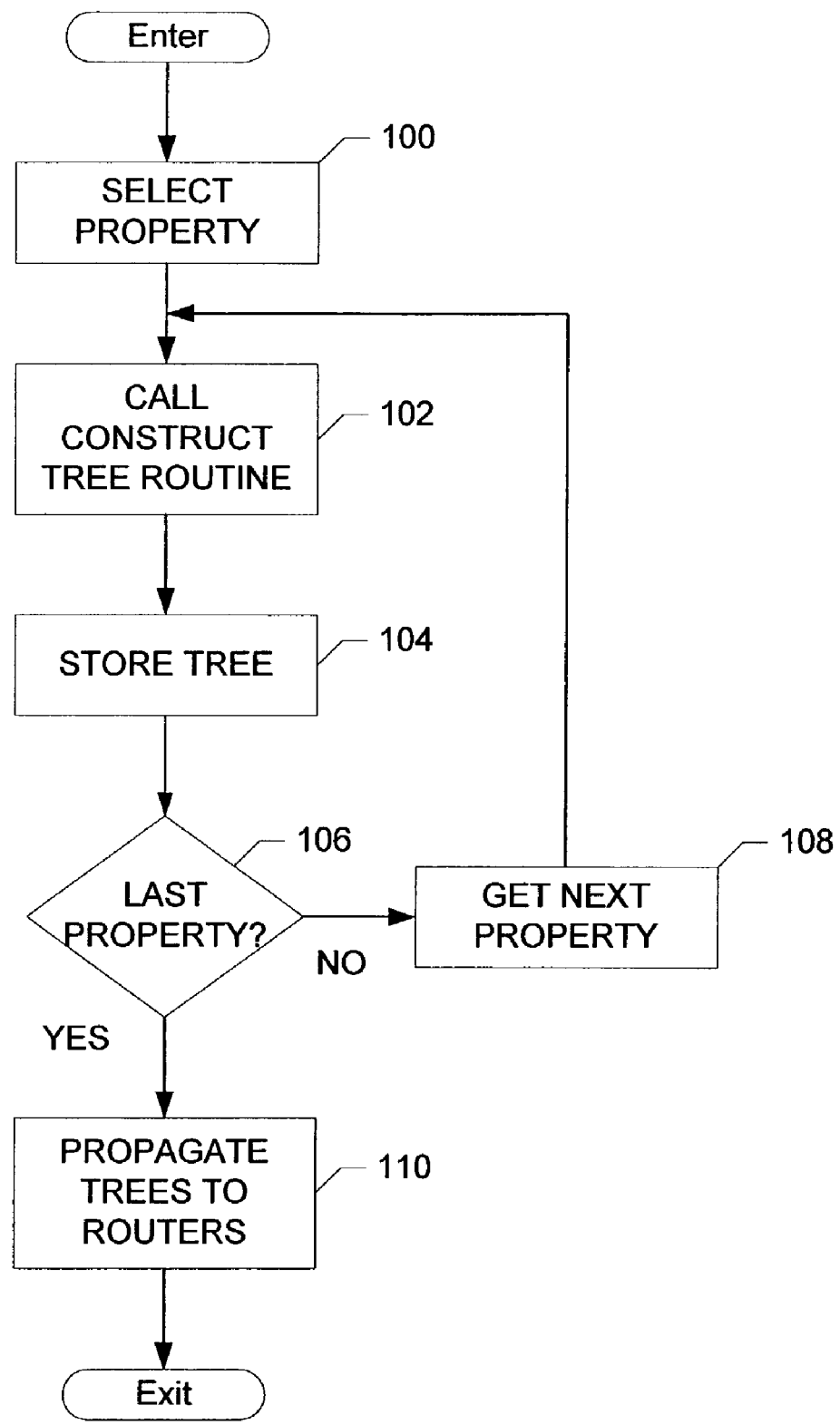
FIG. 5 is a flowchart representing an example program that may be used to implement the tree generator of FIG. 1.

FIG. 1 is a schematic illustration of an example apparatus 10 to route packets in a policy driven networked environment. As explained in detail below, the illustrated apparatus 10 achieves high speed classification and routing of packets by representing the relationships between routing policies and packet properties as bit masks. These bit masks are stored as bit vectors in binary trees that can be quickly searched by a router or the like to extract the policy or policies that apply to a packet or string of packets requiring routing. Once the applicable policy or policies are identified, the packet(s) are routed in accordance with the same.

For the purpose of representing the relationships between the routing policies and the packet properties in a plurality of balanced binary trees, the apparatus 10 is provided with a tree generator 12. As shown in the example of FIG. 2, each policy (e.g., P1, P2, P3, P4, P5, etc) has a relationship to one or more packet properties (e.g., R1, R2, etc). When all of the relationships between a given policy and the specified packet properties are met, the given policy is invoked. If any relationship between a policy and any one of the packet properties is not met, the policy is not invoked, even if all of the other relationships between the policy and the other packet properties are met in full.

In the example of FIG. 2, a relationship between a policy and a packet property can be one of three kinds, namely, a range of values, a single value or a wildcard. More specifically, in the example of FIG. 2, policy P1 has a range of values relationship to both properties R1 and R2. Thus, policy P1 is only invoked when property R1 has a value that falls within the range of 10-20 and when property R2 falls within the range of 10-15. As explained above, both properties R1 and R2 must fall within the ranges specified for those properties for policy P1 to be invoked. If either property R1 or R2 has a value outside of its specified range (e.g., R1 has a value outside of the range 10-20 or R2 has a value that falls outside of the range of 10-15), then policy P1 is not invoked.

In another example, a policy may only be invoked if a property has a specific single value. For instance, in the example of FIG. 2, policy P2 is only invoked if packet property R2 has the value of 12 and packet property R1 falls within a specified range.

In still another example, any value of a given packet property may be sufficient to invoke some policies. Thus, for example, in the illustration of FIG. 2, policy P3 is invoked irrespective of the value of property R2, as long as the values of the other packet properties (e.g., R1) fall within their requirements (e.g., a value of 5-15 for property R1). In the example of FIG. 2, a policy that is invoked irrespective of the value of a given property is said to have a wildcard property, and the corresponding wildcard property is represented by an asterisk (*) in the appropriate box of the chart of FIG. 2.

Persons of ordinary skill in the art will further appreciate that, although in the simplified example of FIG. 2, only two properties are shown, in practice, the chart of FIG. 2 may be many more columns wide and/or rows deep, and/or many more packet properties then shown in FIG. 2 might be required to meet specific criteria (including, for example, falling in a range, equaling a specific value, or being a wildcard) in order for a given policy to be invoked.

For the purpose of creating a binary tree representing the relationships between a given packet property and the routing policies of the network, the tree generator 12 is further provided with a policy value parser 14, a node populator 16, a node placement engine 18, and a node value adjustor 20 (see FIG. 3). The policy value parser 14 parses any property value ranges associated with a given property/policy relationship into single node values. For example, in FIG. 2 property R1 must have a value that falls in the range of 10-20 for property P1 to be invoked. Therefore, the policy value parser 14 creates a first node property value of 10 and a second node property value of 20 for the minimum and maximum values in the acceptable range of values for property R1, respectively.

The node populator 16 operates on the node property values created by the policy value parser 14 to create nodes for the binary tree of the subject property. For example, the node populator 16 places each node property value created by the policy value parser 14 into a data structure (i.e., a node) in association with variables indicating the policy with which the value is associated (e.g., P1) and whether the value is a minimum value (m), a maximum value (x), or a single value (e). The node populator 16 also intitializes a bit vector in the data structure/node to identify the policy that has engendered this node.

In the example illustrated herein, each bit position in a bit vector corresponds to a single policy. For instance, if there are five policies (e.g., P1, P2, P3, P4, and P5) enforced by the network, then a bit vector having five bit positions may be stored in the node. The first bit position may be associated with the first policy (e.g., P1), the second bit position may be associated with the second policy (e.g., P2), the third bit position may be associated with the third policy (e.g., P3), the fourth bit position may be associated with the fourth policy (e.g., P4), and the fifth bit position may be associated with the fifth policy (e.g., P5). To initialize a bit vector to indicate which policy engendered the creation of the associated node, the node populator 16 sets the bit position corresponding to the engendering policy to a first predefined value (e.g., true) and all other bit positions to a second predefined value (e.g., false). For example, if policy P1 has given rise to the creation of a node, the node populator 16 may set the first bit position of the bit vector in the associated node data structure to a value of 1 and all other bit positions in the vector to 0.

In order to place the newly created node in an appropriate position in the binary tree, the tree generator 12 is further provided with a node placement engine 18. The node placement engine 18 compares the property value associated with the newly created node to at least some of the property value(s) of the node(s) already existing in the binary tree, if any. Based on the comparison(s), the node placement engine 18 locates an appropriate place in the tree for the newly created node and stores the node at that location. Preferably, the node placement engine 18 selects node positions in a manner that seeks to height balance the binary tree to thereby minimize the time required to search the tree. Thus, the node placement engine 18 preferably includes tree balancing capability such that the binary tree is implemented as a balanced binary tree.

The node value adjustor 20 cooperates with the node placement engine 18 to selectively adjust the values in the bit vector of the newly created node and/or the values in the bit vector(s) of the existing node(s) as the node placement engine 18 moves through the tree to find the appropriate position for the newly created node. The values of the bit vector(s) are adjusted by the node value adjustor 20 to reflect the relationships of the nodes to one another as explained in further detail below.

As mentioned above, some policies are associated with one or more wildcard properties. In the illustrated example, a wildcard property is not represented as a node in a binary tree. Instead, it is stored as a separate data structure in association with the binary tree for the corresponding packet property. The wildcard data structure includes a flag indicating whether the structure is valid (i.e., whether a wildcard property is present). It also includes a wildcard vector (see, for example, FIG. 8). A wildcard vector has the same number of bits as the bit vectors in the nodes of the binary tree and its bit positions follow the same convention as the bit vectors in the binary tree.

For the purpose of populating a wildcard data structure if a wildcard property is identified by the policy value parser 14, the tree generator 12 is further provided with a wildcard vector generator 22. The wildcard vector generator 22 generates a wildcard vector having the bit position(s) corresponding to the polic(ies) associated with the wildcard propert(ies) set to true. For example, using the above convention (bit position 1=P1, bit position 2=P2, etc) with the example of FIG. 2, since policy P3 is associated with a wildcard property R2, the wildcard vector generator 22 generates a vector <00100> and stores that wildcard vector in association with the binary tree for property R2.

The tree generator 12 may be implemented by, for example, a server coupled to the policy driven network. Alternatively, it may be implemented at multiple points throughout the network (e.g., at every router and/or gateway in the network). Thus, although in the example of FIG. 1, the apparatus 10 is shown to include only one tree generator 12, persons of ordinary skill in the art will readily appreciate that the apparatus 10 may be implemented as a distributed system with multiple tree generators. If implemented by a single tree generator, after the binary trees are created, they are propagated out to the routers/gateways throughout the network that are expected to perform policy based routing.

Each router/gateway that performs such policy based routing is provided with a search engine 28 and a routing engine 30 (see FIG. 1). Thus, although in the example of FIG. 1, the apparatus 10 is shown to include only one tree generator 12, one search engine 28 and one routing engine 30, persons of ordinary skill in the art will readily appreciate that the apparatus 10 may be implemented as a distributed system with multiple tree generators 12, multiple search engines 28 and/or multiple routing engines 30.

Each search engine 28 is responsive to receipt of a packet of information at the corresponding router/gateway to search at least a subset of the binary trees created by the tree generator 12. The search engine 28 searches the trees to identify any routing policy or policies that are applicable to the packet(s) received by the router/gateway. The search engine 28 performs this search by extracting property information from the header(s) of the received packet(s). For example, in an Internet Protocol (IP) based network, the packets will be IP packets with IP headers and the search engine 28 can extract values from some or all of the fields of the IP headers for use in searching the binary trees.

An example search engine 28 is shown in greater detail in FIG. 4. In the example of FIG. 4, the search engine 28 includes a tree searcher 34 to search a binary tree for a node having a property value of interest. For example, the tree searcher 34 may search the binary tree associated with property R1 for a node storing the value 12, if a received packet has an R1 value of 12 in its IP header. When a match is found, the bit vector from the matching node is retrieved by the search engine 28.

Because the binary trees do not store all possible values, it will often be the case that the tree searcher 34 ends the search at a node that does not store exactly the same value as the received packet. Thus, it may be necessary to adjust the values in the bit vector of the non-exactly matching node to ensure the proper policies are invoked. To this end, the search engine 28 is further provided with a vector processor 36. When appropriate, the vector processor 36 adjusts the bit vector identified by the tree searcher 34 as explained in detail below.

As explained above, some policies are associated with wildcard properties. As also explained above, relationships between policies and wildcard properties are represented by wildcard vectors that are associated with, but not part of, the binary trees created by the apparatus 10. Thus, when the tree searcher 34 and vector processor 36 retrieve a result vector from a tree, the search engine 28 invokes its wildcard adjustor 38 to determine if a wildcard property is implicated. In particular, the wildcard adjustor 38 checks the wildcard data structure associated with the subject binary tree to determine if the wildcard flag is set to true. If the wildcard flag is not set to true, then no wildcard vector is associated with the subject tree. Otherwise, a wildcard vector is present. If a wildcard vector is present, the wildcard adjustor performs a logical OR operation on the wildcard vector and the result vector retrieved by the tree searcher 34/vector processor 36 to ensure the result vector reflects the wildcard property.

As stated above, typically multiple packet properties must have certain values to invoke a given policy. Since a binary tree is created for each of the packet properties, the tree generator 12 will typically search multiple binary trees to determine which, if any routing policies, apply to a received packet. Thus, the tree searcher 34/vector processor 36/wildcard adjustor 38 will return a result vector for each binary tree that is searched. To determine if all of the property value requirements of any of the policies are met, the search engine is provided with a result compiler 40. The result compiler 40 combines the vectors identified from the different binary trees to form a composite result vector. The result compiler 40 may combine the vectors by, for example, performing a logical AND operation on the result vectors from the various binary trees to find their intersection. The search engine 40 then delivers the composite result vector to the routing engine 30.

The routing engine 30 examines the composite result vector to determine which, if any, routing policies apply to the received packet. If any bit in the composite result vector is set to true, the policy corresponding to that bit position is invoked by the received packet. Accordingly, the routing engine 30 routes the received packet in accordance with the policy or policies indicated in the composite vector.

Flowcharts representative of example machine readable instructions for implementing the apparatus 10 of FIG. 1 are shown in FIGS. 5, 6A-6J, 9 and 10A-10E. In this example, the machine readable instructions comprise a program for execution by a processor such as the processor 1012 shown in the example computer 1000 discussed below in connection with FIG. 11. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the tree generator 12, the policy value parser 14, the node populator 16, the node placement engine 18, the node value adjustor 20, the wildcard vector adjustor 22, the search engine 28, the routing engine 30, the tree searcher 34, the vector processor 36, the wildcard adjustor 38 and/or the result compiler 40 could be implemented by software, hardware, and/or firmware. Further, although the example program is described with reference to the flowcharts illustrated in FIGS. 5, 6A-6J, 9 and 10A-10E, persons of ordinary skill in the art will readily appreciate that many other methods of implementing the example apparatus 10 may alternatively be used. For example, the order of execution of the blocks may be changed, and/or some of the blocks described may be changed, eliminated, or combined.

The program of FIG. 5 begins at block 100 where the tree generator 12 selects a packet property for which a binary tree is to be constructed. For example, the tree generator 12 may select the source address field (R1) as the packet property to be developed. Regardless of the packet property selected, the tree generator 12 next calls the construct tree routine (block 102) to develop a binary tree representing any relationship(s) between the selected packet property and the routing policies that govern routing in the network in question. An example construct tree routine is shown in FIGS. 6A-6J and will be discussed in detail below. For now, suffice it to say that the construct tree routine returns a complete binary tree for the property in question (block 102).

Once a binary tree is returned (block 102), the tree is stored by the tree generator 12 (block 104). The tree generator 12 then determines whether there are more packet properties to be represented by binary trees (block 106). If so, the next packet property is selected (block 106) and control returns to block 102 where the construct tree routine is called for the new property. Control continues to loop through blocks 102-108 until a binary tree is created for every packet property that is to be used to trigger policy enforcement (block 106). When all such binary trees are created, control advances to block 110.

At block 110, the tree generator 12 propagates the binary trees to the routers and/or gateways that are intended to enforce the routing policies of the network by transmitting the trees as one or more data packets or the like to the network addresses of the routers/gateways. The tree generation process is then complete and terminates.

Persons of ordinary skill in the art will readily appreciate that, although FIG. 5 illustrates a centralized, tree-create and propagate model, other tree generation models could alternatively be used. For example, some or all of the routers/gateways could alternatively self-generate the binary trees to avoid or reduce the need to propagate the trees throughout the network. Similarly, persons of ordinary skill in the art will readily appreciate that the tree generation process should be re-performed whenever a new policy is added to the network, whenever an existing policy is eliminated from the network, whenever an existing policy is changed and/or whenever a new relationship between an existing policy and one or more packet properties is selected to trigger enforcement of a policy.

An example construct tree routine will now be explained in connection with FIGS. 6A-6J. The example construct tree routine will be explained assuming that the relationships shown in the chart of FIG. 2 are being transformed into binary trees. In particular, it will be assumed that the relationships between the routing policies P1, P2, P3, P4, and P5 and property R1 are being converted into a binary tree. It is also assumed in the following that a bit position convention has been selected. Specifically, it is assumed that the bit vector of each node has five bit positions and that the first bit position corresponds to policy P1, the second bit position corresponds to policy P2, the third bit position corresponds to policy P3, the fourth bit position corresponds to policy P4, and the fifth bit position corresponds to policy P5. In the following example, a binary tree will be constructed by creating a node for every non-wildcard entry in the first column of the table of FIG. 2 (i.e., the column specifying the relationships between the routing policies and the packet property R1). Thus, there will be nodes in the binary tree for property R1 corresponding to property values 1, 3, 5, 10, 11, 15, 19 and 20, because each of those values represents an entry in the first column of FIG. 2. As a result, the final binary tree for property R1 will have eight nodes.

Figure 6A:
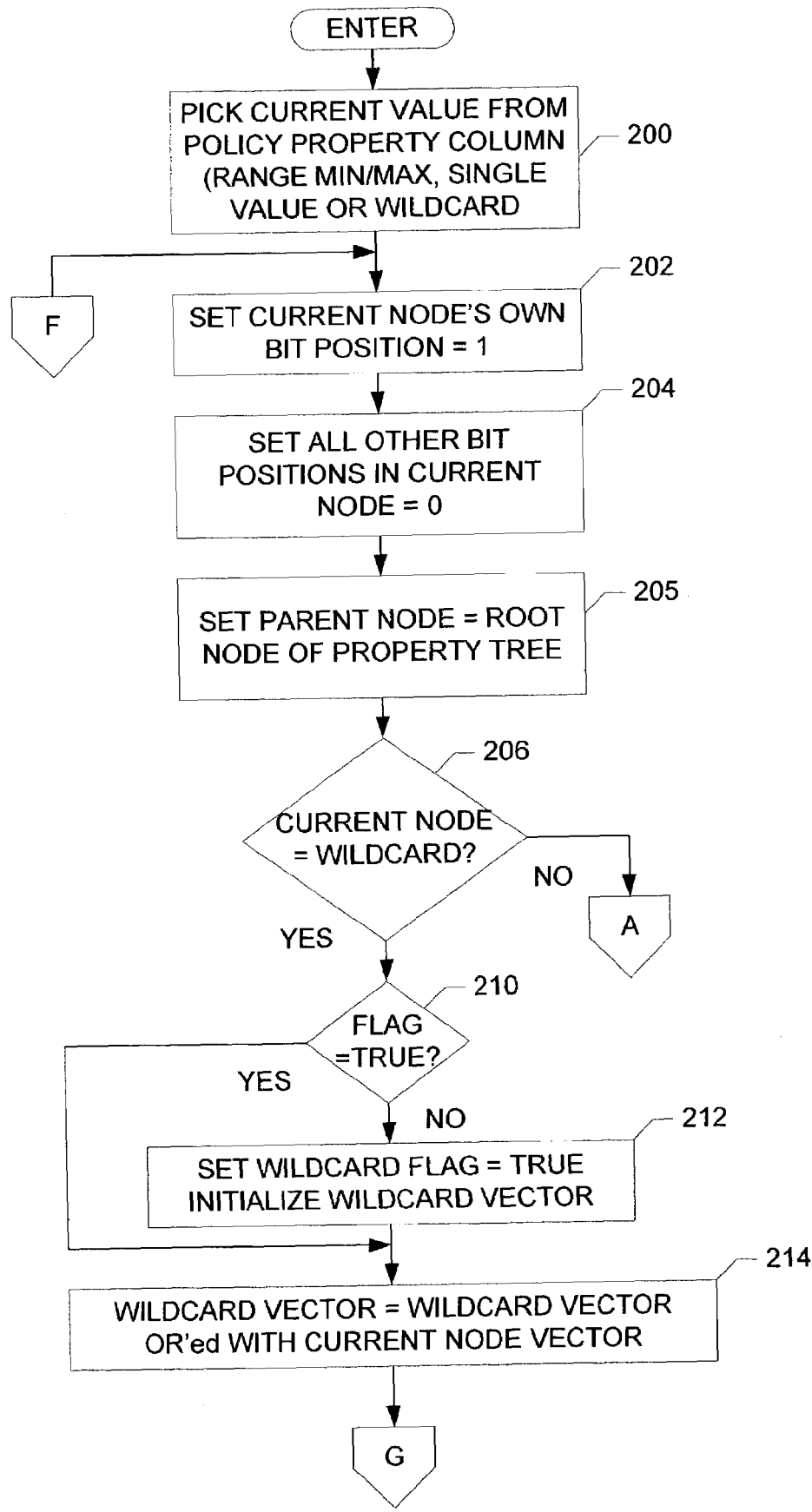

As shown in FIG. 6A, the example construct tree routine, begins at block 200 when the policy value parser 14 of the tree generator 12 selects a property value from the list of property values (e.g., 1, 3, 5, 10, 11, 15, 19 and 20) to be converted into nodes. It is desirable to maintain the binary tree in height balanced fashion (i.e., with a roughly equal number of nodes on each side of the top parent node of the tree) to minimize the time required to search the tree. To achieve this end, left rotation and right rotation of tree nodes are implied as nodes are added to maintain a balanced binary tree. Also, a node placement convention is used. In this convention, when deciding where to place a node on a tree, the property value of the node being placed is first compared to the property value of the node with the highest position on the tree. If the property value of the node being placed is greater than the property value of the existing node, the node being placed will be positioned to the right and below of the existing node. If, on the other hand, the property value comparison reveals that the node being placed has a lower property value than the existing node, the node being placed is placed below and to the left of the existing node. The node being placed is compared to every existing node it encounters as the node is passed down along the tree until the node is placed at the currently lowest rung on the tree. This move-right or move-left convention is followed in each comparison.

In view of this move-right/move-left convention, the first value selected for creation of the first node is a value in the middle of the list of values (e.g., value 11). Because roughly half of the values are greater than the middle value and roughly half the values are smaller than the middle value, following the move-left/move-right convention explained above will place a roughly equal number of nodes on each half of the tree.

Figure 7A:
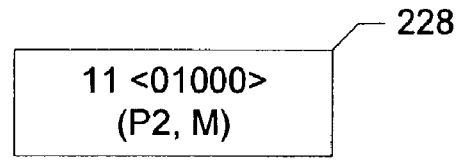
FIGS. 7A-7G are schematic illustrations of an example balanced binary tree being constructed by the program of FIG. 5 using the example relationships between property R1 and the policies illustrated in the example of FIG. 2.

After the middle value in the list of property values to be placed is identified by the policy value parser 14 (block 200), a data structure representative of a node is created and the node populator 16 sets the bit position corresponding to the routing policy associated with the property value being placed to true (block 202). For example, since, in this example, a node corresponding to property value 11 is being placed on the tree, and since property value 11 is associated with policy P2 (see FIG. 2), the node populator 16 sets the second bit position in the bit vector of the newly created node data structure to 1 (block 202). The node populator 16 then sets all of the other bit positions in the bit vector of the newly created node data structure to 0 such that the bit vector has the format <01000> as shown in FIG. 7A (block 204). The node populator 16 then sets the parent node equal to the root node of the property tree (block 205).

Figure 6B:
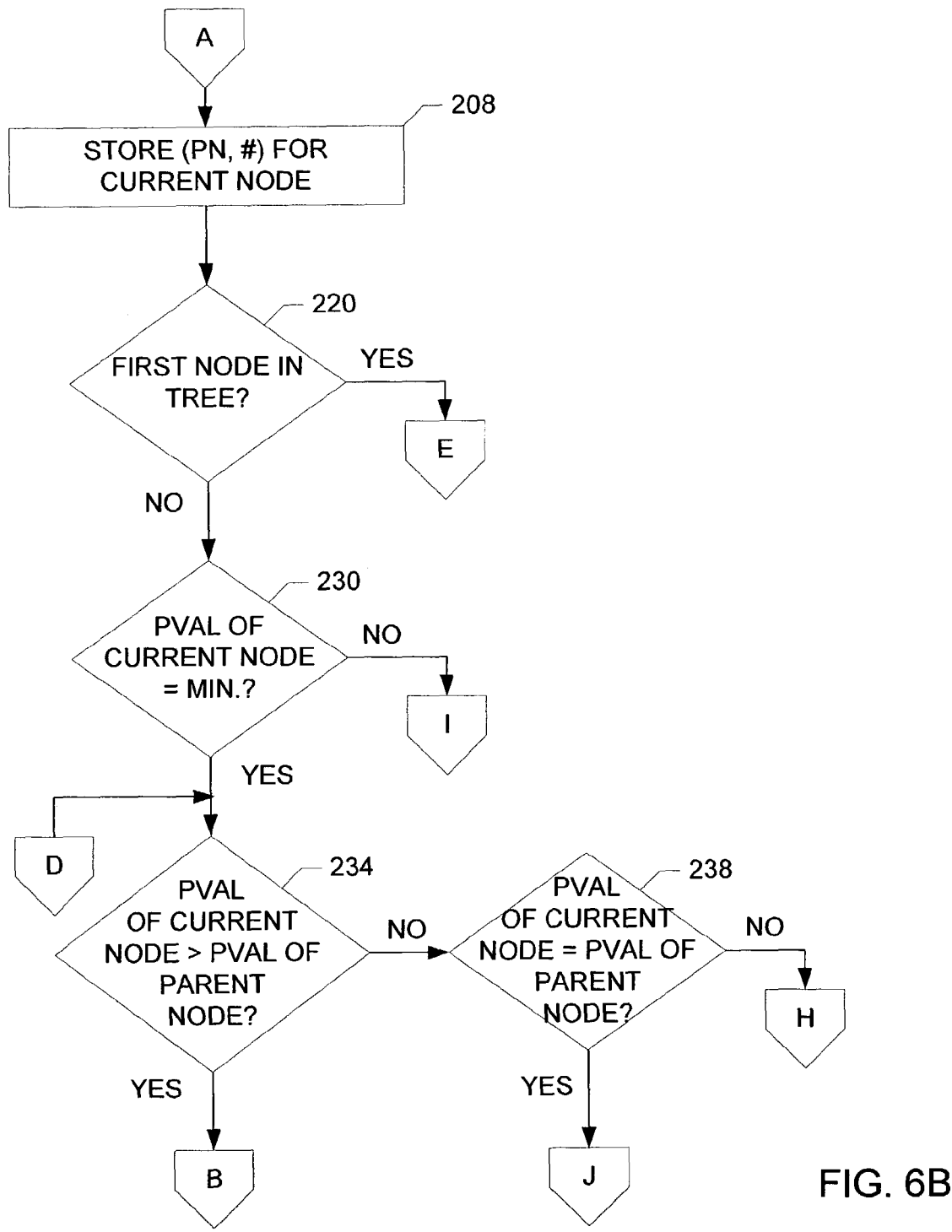
Figure 6D:
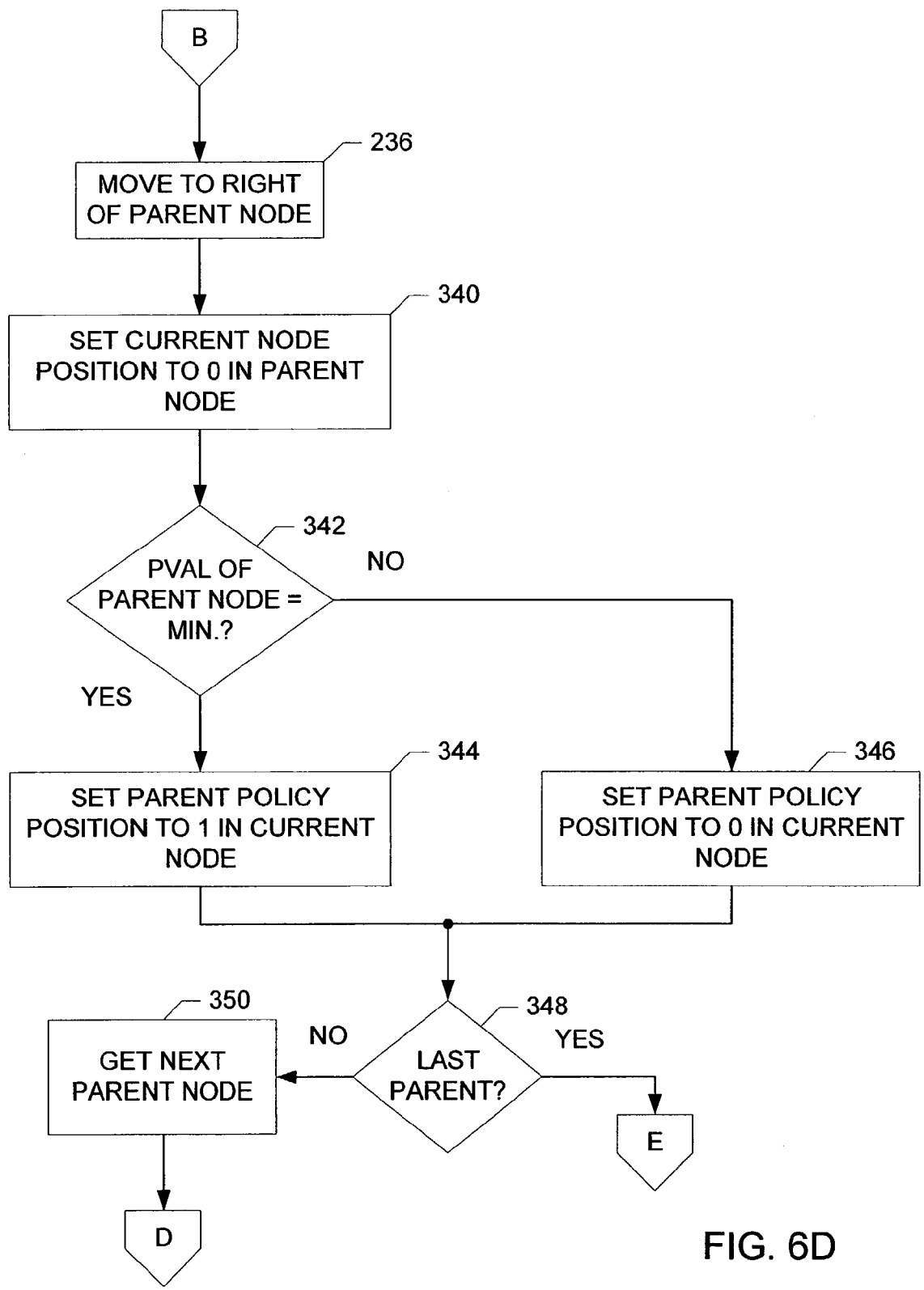

The node populator 16 then determines if the property value being converted into a node is a wildcard value (block 206). If it is not a wildcard value (block 206), control advances to block 208 (FIG. 6B). Otherwise, because wildcard values are not assigned nodes on the binary tree, the creation of a node is terminated and control advances to block 210 (FIG. 6A).

Assuming for purposes of discussion that the current property value is a wildcard value associated with policy P2, the wildcard vector generator 22 first checks to see if a wildcard flag associated with the binary tree for packet property R1 is set to true (block 210). If so, then a wildcard vector already exists for the binary tree being created (i.e., there is at least two wildcard policies associated with the packet property giving rise to the binary tree) and control advances to block 214. Otherwise, this is the first instance of a wildcard being associated with the binary tree under construction and control advances to block 212.

Assuming, for purposes of discussion, that this is the first instance of a wildcard being associated with the binary tree currently under construction (block 210), control advances to block 212 where the wildcard vector generator 22 sets the wildcard flag associated with the binary tree for packet property R1 to true and initializes a wildcard bit vector such that every bit position in the wildcard bit vector is set to false (e.g., zero). Control then advances to block 214.

Regardless of whether control reaches block 214 from block 212 or directly from block 210, at block 214 the wildcard vector generator 22 performs a logical OR operation on the bit vector that was just created at blocks 202-204 and the wildcard vector for the binary tree currently being created to adjust the bit position of the wildcard vector for the current policy (e.g., P2) to true. The adjusted wildcard vector is then saved and control advances to block 216 of FIG. 6C.

If the current property value (e.g., the wildcard value) is the last value being placed (block 216, FIG. 6C), the construct tree routine terminates. Otherwise, a new property value from the list of property values is selected for node creation (block 218), and control returns to block 202 of FIG. 6A.

Returning to block 206 of FIG. 6A and the example of packet property R1 of FIG. 2, since the current value being placed (e.g., 11) is not a wildcard value (block 206), control advances to block 208 of FIG. 6B. At block 208, the node populator 16 continues to populate the node data structure for the current value by storing an indicator of the routing policy (e.g., P2) associated with the property value and an indicator of the significance of the property value for this policy in the data structure. Since, in this example, the property value 11 is the lowest value in a range of property values that may invoke routing policy P2, the node populator 16 stores the values (P2, m) in the newly created node data structure, where "P2" is the policy number associated with the subject property value and "m" represents a minimum value in a range of values. Other indicators that could be represented in association with a policy number include "x" for representing a value that is the maximum value in a range of values that invoke a particular routing policy and "e" for a single value (i.e., not a range of values).

After the appropriate policy indicator and significance indicator are stored (block 208), the node placement engine 18 determines if the node being created is the first node in the binary tree under construction (block 220). If so, control advances to block 222 (FIG. 6C) where the newly created node 228 is placed in the top position of the binary tree for property R1 as shown in FIG. 7A. Control then advances to block 216 where it is determined if there are more nodes to place. If there are no more nodes to place (block 216), the construct tree routine terminates. Otherwise, the next property value in the list of property values is selected (block 218) and control returns to block 202 (FIG. 6A) to begin processing another property value/node as explained above.

Continuing with the example of FIG. 2 and assuming that the next property value selected from the list of property values is the value 5, a new node data structure having a bit vector with bit position 3 (e.g., value 5 is associated with policy P3) set to true and all other bit positions set to false is created at blocks 202-204. Since property value 5 is not a wildcard value (block 206), control advances to block 208 (FIG. 6B). Since, in this example, the property value 5 is the lowest value in a range of property values that invoke routing policy P3, the node populator 16 stores the values (P3, m) in the newly created node data structure, where "P3" is the policy number and "m" indicates that the property value associated with the node is a minimum value in a range of values that invoke policy P3. Control then advances to block 220.

Figure 6E:
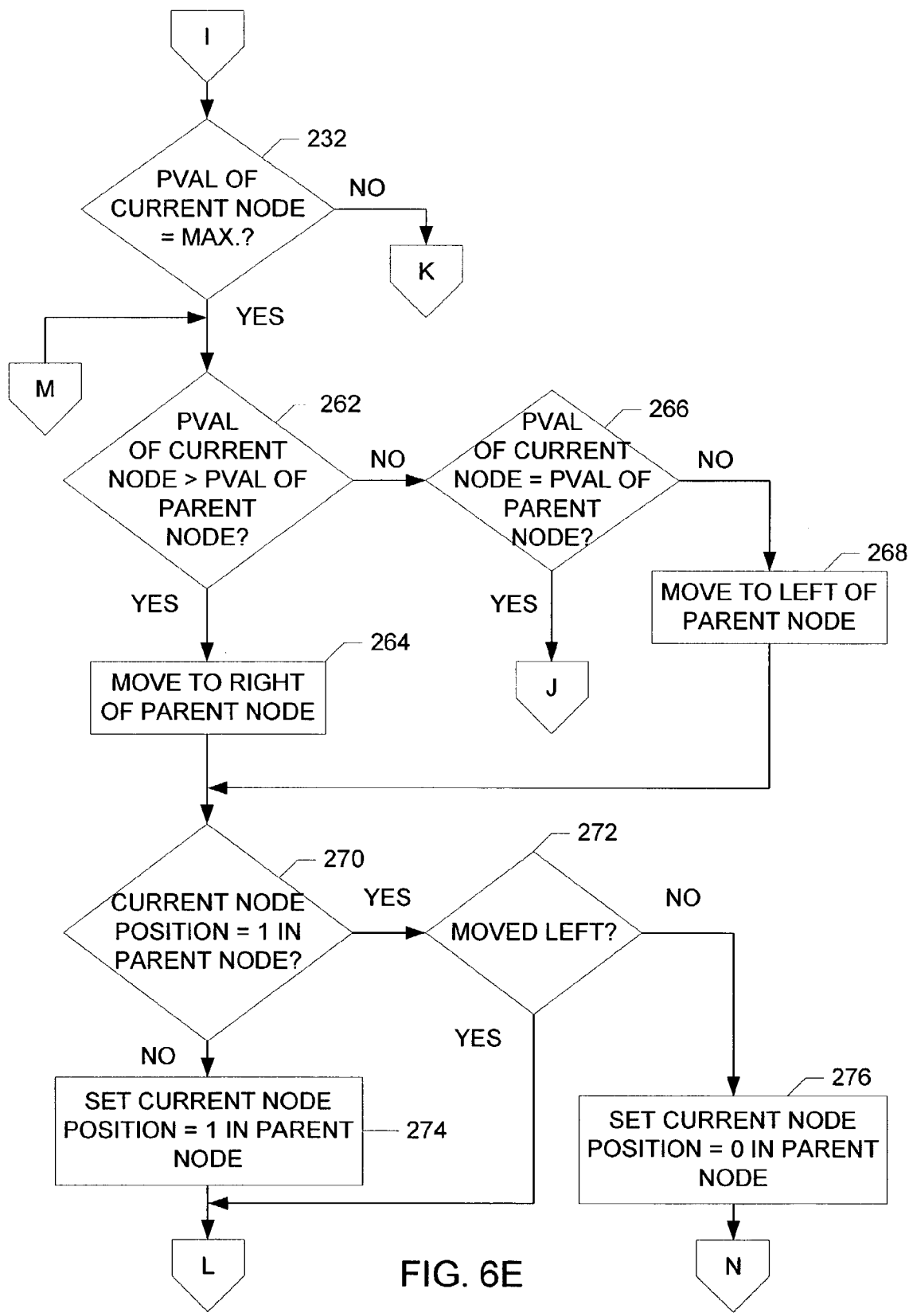

Since, in this example, the current node is not the first node in the binary tree (block 220), control advances to block 230 where the node placement engine 18 determines if the current value being placed is the minimum of a range of property values that invoke the associated policy. If not, control advances to block 232 (FIG. 6E). Since, in this example, the property value 5 is a minimum of a range of values that invoke policy P3, control advances to block 234 of FIG. 6B.

At block 234, the node placement engine 18 compares the property value (PVAL) of the new node to the property value (PVAL) of the first node in the tree. If the property value of the new node is greater than the property value of the existing node (block 234), control advances to block 236 of FIG. 6D. Otherwise control advances to block 238 of FIG. 6B. Since, in this example, only one node currently exists in the tree (see FIG. 7A) and the property value (i.e., 5) of the current node is less than the property value (i.e., 11) of the existing node 228, control advances to block 238 of FIG. 6B.

Figure 6F:
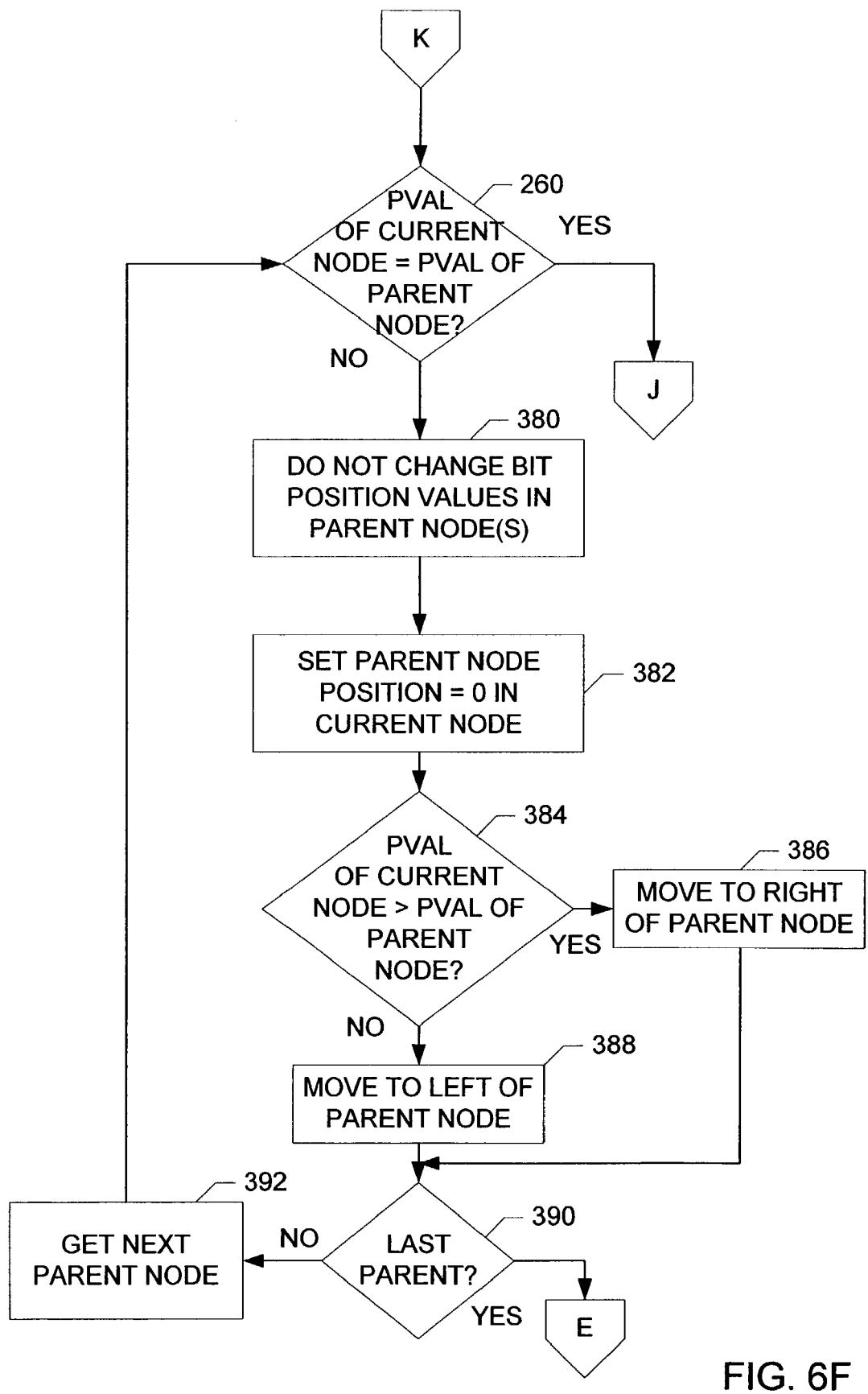
Figure 6H:
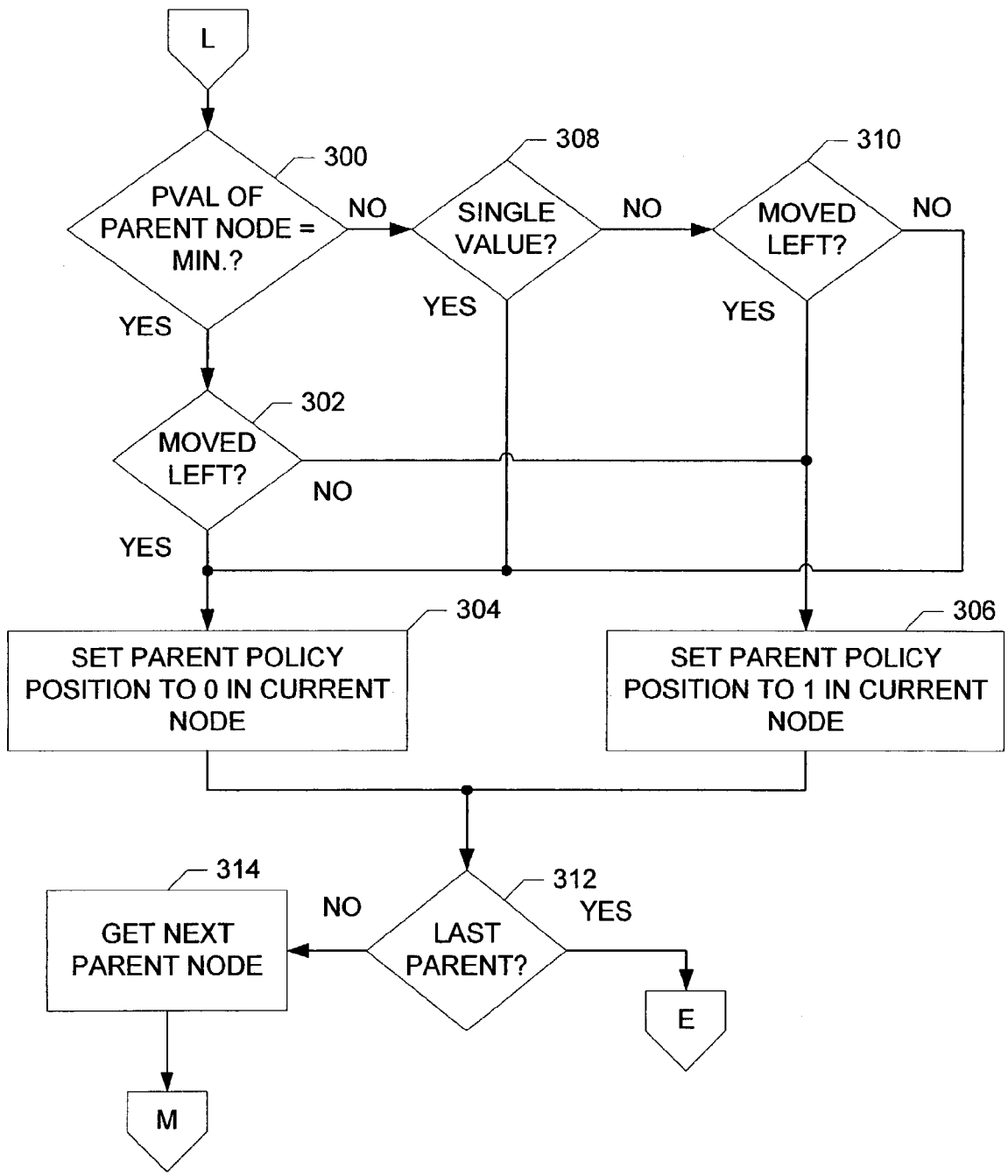
Figure 6I:
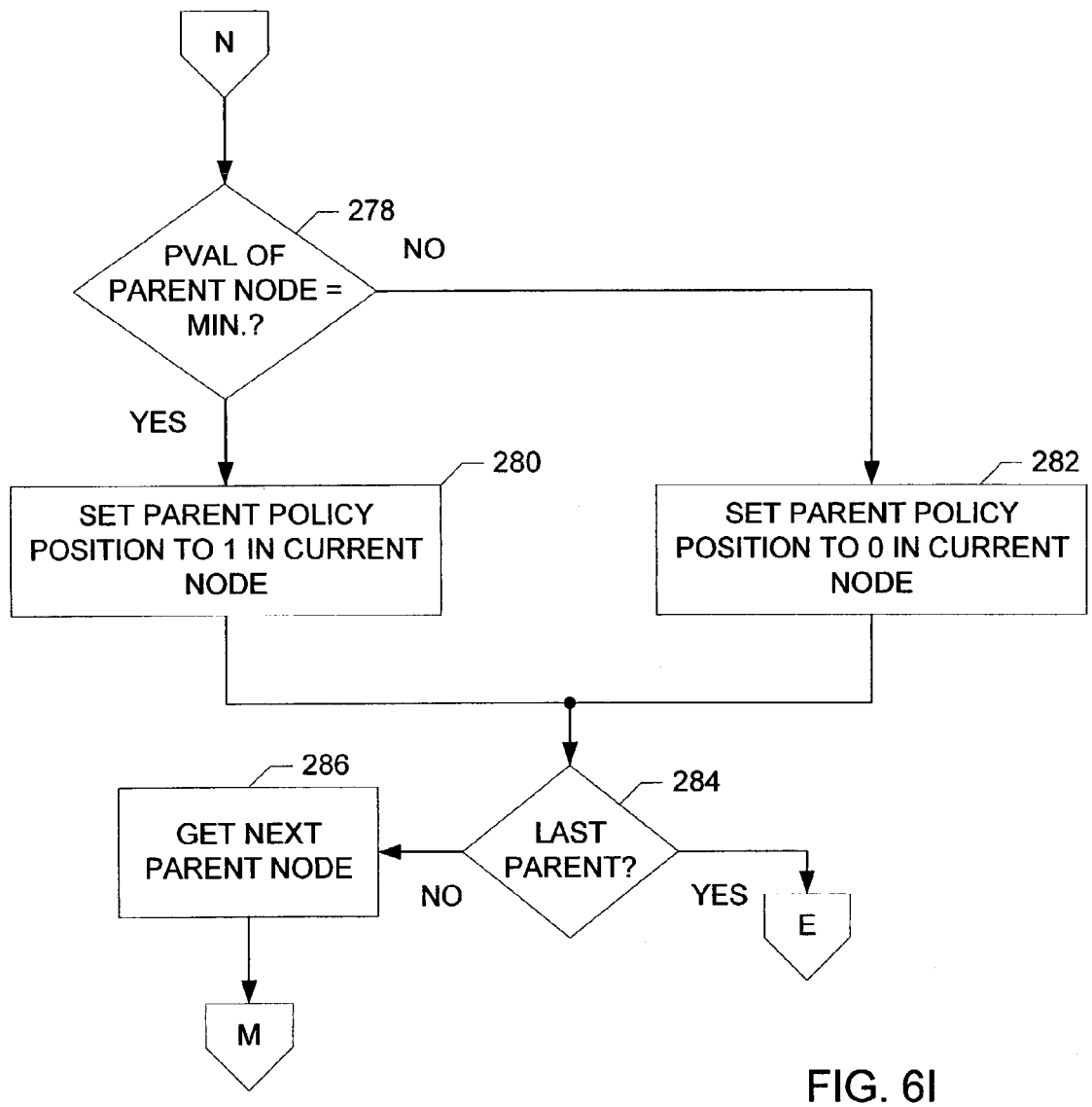
Figure 6J:
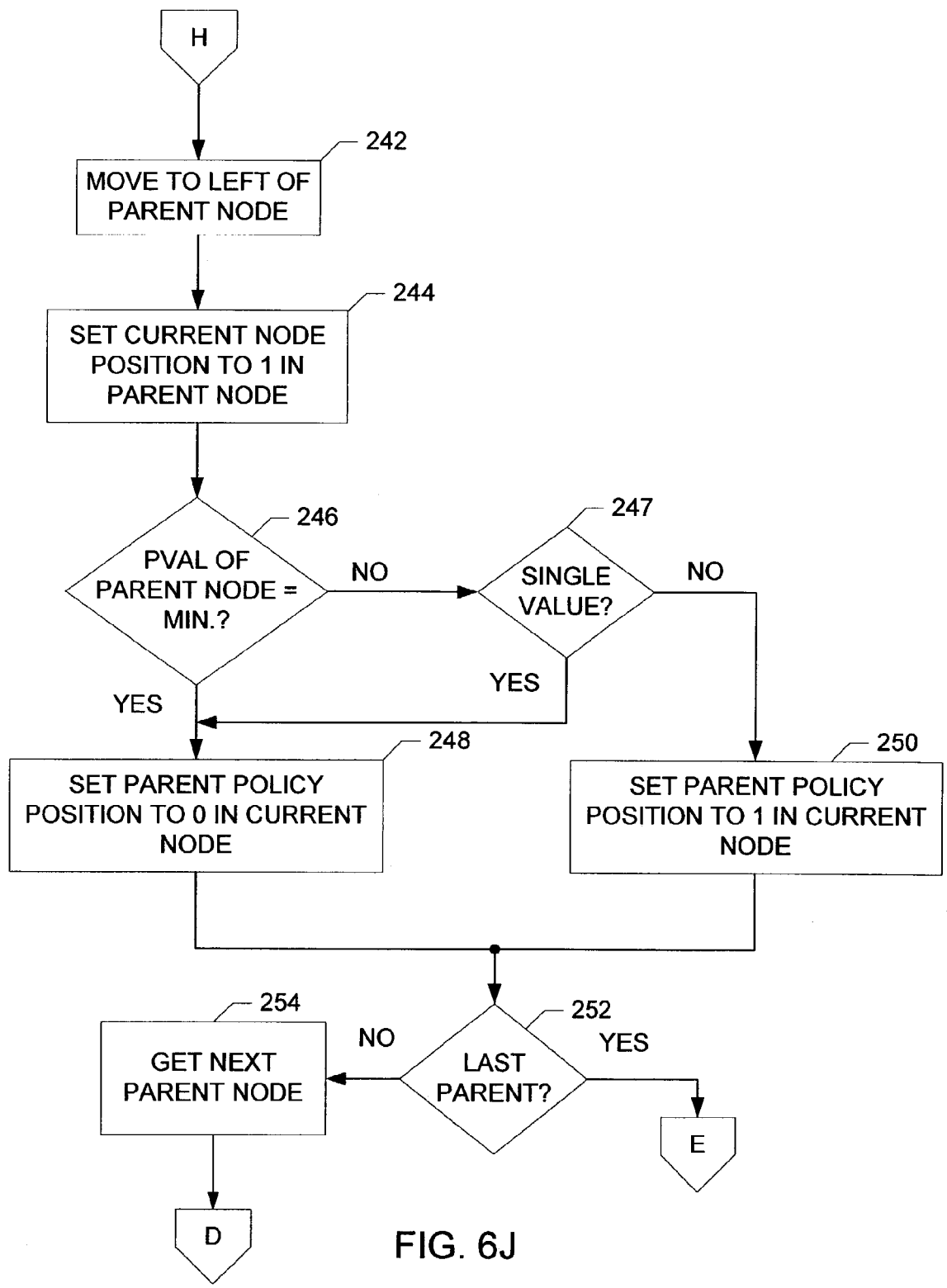

At block 238, the node placement engine 18 determines if the property value (e.g., 5) of the current node is equal to the property value of the existing node being reviewed (e.g., node 228). If so, control advances to block 240 of FIG. 6G. Otherwise, control advances to block 242 of FIG. 6J. Since, in this example, the property value (i.e., 5) of the newly created node is not equal to the property value (i.e., 11) of node 228 (block 238), control advances to block 242 (FIG. 6J).

At block 242, the node placement engine 18 moves its pointer to the left of node 228. The node value adjustor 20 then sets the bit position corresponding to the policy (e.g., P3) associated with the newly created node to one in the parent node (block 244). If the parent node (e.g., node 228) contains a property value that represents a minimum in a range of values (block 246), control advances to block 248 where the node value adjustor 20 sets the bit position corresponding to the policy (e.g., P2) associated with the parent node to zero in the newly created node. Otherwise, if the parent node (e.g., node 228) does not contain a property value that represents a minimum in a range of values (block 246), control advances to block 247 where it is determined if the current property value (e.g., 5) is a single value or an end of a range of values (i.e., a maximum or a minimum). If the current property value is a single value (block 247), control proceeds to block 248. Otherwise, control proceeds to block 250 where the node value adjustor 20 sets the bit position corresponding to the policy (e.g., P2) associated with the parent node to one in the newly created node. Since in the current example, the parent node 228 is associated with a minimum of a range, control passes through block 248 where the second bit position of the newly created node is set to zero.

Regardless of whether control advances through block 248 or block 250, control arrives at block 252. At block 252, the node placement engine 18 determines if its pointer is directed to an open spot on the tree or to another node. If the pointer is to an open spot (i.e., a spot which is not occupied by an existing node), control returns to block 222 of FIG. 6C where the newly created node is placed on the tree as explained above. Otherwise, the data of the node on the tree that is currently pointed to by the node placement engine 18 is retrieved from that node's data structure (block 254) and control returns to block 234 (FIG. 6B) where the comparison of the property values of the newly created node and the next existing node is performed as explained above.

Figure 7B:
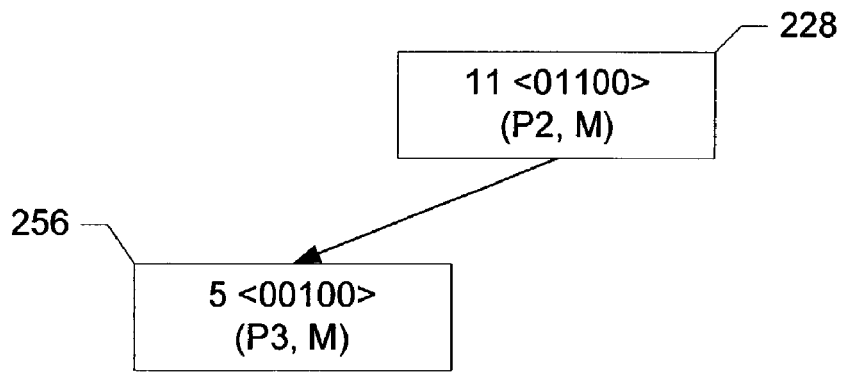

Since in the current example, the pointer of the node placement engine 18 points to a vacant spot at the current bottom of the tree (block 252), the newly created node 256 is inserted in the tree at the currently pointed to position as shown in FIG. 7B. Control then advances from block 222 (FIG. 6C) to blocks 216 and 218 as explained above.

Continuing with the example of FIG. 7 and assuming that the next property value to be inserted is value 19, after proceeding through blocks 202-220 as explained above, control arrives at block 230 (FIG. 6B). Since the property value 19 is not a minimum of a range (block 230), control advances to block 232 of FIG. 6E. At block 232, the node placement engine 18 determines if the property value of the newly created node is a maximum value in a range that invokes the policy associated with the newly created node. If not, control advances to block 260 (FIG. 6F). Otherwise, control advances to block 262 of FIG. 6E.

Since, in the current example, property value 19 is a maximum value in the range of values that invoke policy P2, control advances to block 262. At block 262, the node placement engine 18 determines if the property value of the current node (e.g., 19) is larger than the property value of the existing node to which the pointer of the node placement engine 18 is pointing. If so, control advances to block 264 where the node placement engine 18 moves its pointer to point to the node position to the right of the parent node. Otherwise, control advances to block 266.

If control advances to block 266, the node placement engine 18 determines if the property value of the newly created node equals the property value of the parent node to which the pointer of the node placement engine 18 is pointing. If so, control advances to block 240 of FIG. 6G. Otherwise, control advances to block 268 where the node placement engine 18 moves its pointer to point to the node position to the left of the parent node.

Returning to block 262, since the node placement engine's pointer is re-set to point to the top node on the tree whenever creation of a new node is commenced, in the current example, the node placement engine 18 compares the property values of the newly created node and the top node 228 in the tree (see FIG. 7B). Since, in this example, the property value (i.e., 19)

of the newly created node is larger than the property value (i.e., 11) of node 228, control advances to block 264 where the pointer of the node placement engine 18 is moved to the right of the parent node.

Irrespective of whether control arrives at block 270 of FIG. 6E via block 264 or block 268, at block 270 the node value adjustor 20 determines if the bit position associated with the policy of the newly created node is set to one in the parent node. If so, control advances to block 272. Otherwise, control advances to block 274.

In the current example, the bit position associated with the policy (i.e., P2) of the newly created node is set to one in the parent node 228 (see FIG. 7B), accordingly control advances to block 272. Since the pointer of the node placement engine 18 moved to the right at block 264, control advances from block 272 to block 276.

At block 276, the node value adjustor 20 sets the bit position associated with the policy (e.g., P2) of the newly created node to zero in the parent node (e.g., node 228). Control then advances to block 278 of FIG. 6I.

If the parent node (e.g., node 228) contains a property value that represents a minimum in a range of values (block 278), control advances to block 280 where the node value adjustor 20 sets the bit position corresponding to the policy (e.g., P2) associated with the parent node to one in the newly created node. Otherwise, if the parent node (e.g., node 228) contains a property value that represents a maximum in a range of values or a single value (block 278), control advances to block 282 where the node value adjustor 20 sets the bit position corresponding to the policy (e.g., P2) associated with the parent node to zero in the newly created node. Since in the current example, the parent node 228 is associated with a minimum of a range, control passes through block 280 where the second bit position of the newly created node is set to one.

Regardless of whether control advances through block 280 or block 282, control arrives at block 284. At block 284, the node placement engine 18 determines if its pointer is directed to an open spot on the tree or to another node. If the pointer is to an open spot (i.e., an unoccupied spot on the tree), control returns to block 222 of FIG. 6C where the newly created node is placed on the tree as explained above. Otherwise, the data of the node on the tree that is currently pointed to by the node placement engine 18 is retrieved from that node's data structure (block 286) and control returns to block 262 (FIG. 6E) where the comparison of the property values of the newly created node and the next node in the tree is performed as explained above.

Figure 7C:
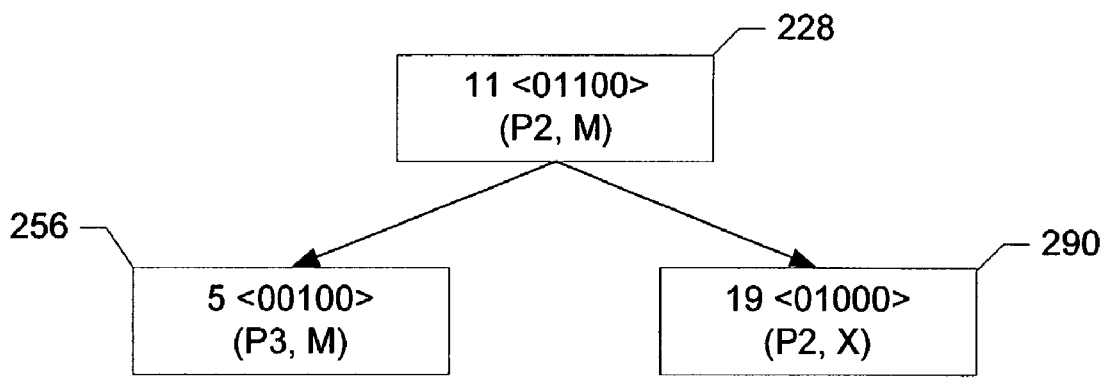

Since, in the current example, the pointer of the node placement engine 18 points to an unoccupied spot on the current bottom of the tree (block 286), the newly created node 290 is inserted in the tree at the currently pointed to position as shown in FIG. 7C. Control then advances from block 222 (FIG. 6C) to blocks 216 and 218 as explained above.

Continuing with the example of FIG. 7 and assuming that the next property value to be inserted is value 20, after proceeding through blocks 202-220 as explained above, control arrives at block 230 (FIG. 6B). Because, in this example, the property value 20 is a maximum of a range of property values, control advances from block 230 to block 232 of FIG. 6E. Again, because the property value 20 is a maximum value in a range, control advances to block 262. A comparison of the property value 20 of the current node and the property value of the first node 228 in the tree reveals that the current property value (i.e., 20) is greater than the value (i.e., 11) of the existing node 228. Accordingly, the pointer of the placement engine 18 moves to the right of the node 228 (block 264). Because the bit position corresponding to the routing policy of the newly created node (e.g., P1) is set to zero in the parent node 228 (see FIG. 7C), control advances from block 270 to block 274.

At block 274, the node value adjustor 20 sets the bit position associated with the policy (e.g., P1) of the newly created node to one in the parent node (e.g., node 228). Control then advances to block 300 of FIG. 6H.

If the parent node (e.g., node 228) contains a property value that represents a minimum in a range of values (block 300), control advances to block 302 where it is determined if the pointer of the node placement engine 18 moved to the left of the parent node. If so, control advances to block 304 where the node value adjustor 20 sets the bit position corresponding to the policy (e.g., P2) associated with the parent node to zero in the newly created node. Otherwise, if the pointer of the node placement engine 18 moved to the right (block 302), the node value adjustor 20 sets the bit position corresponding to the policy associated with the parent node to one in the newly created node (block 306).

Returning to block 300, if the parent node (e.g., node 228) does not contain a property value that represents a minimum in a range of values, control advances to block 308. At block 308 it is determined if the current property value is a single value. If so, control advances to block 304. Otherwise, the current property value is a maximum of a range and control advances to block 310.

At block 310, it is determined whether the pointer of the node placement engine 18 moved to the left of the parent node. If not, control advances to block 304. Otherwise, control advances to block 306 where the node value adjustor 20 sets the bit position corresponding to the policy (e.g., P2) associated with the parent node to one in the newly created node. Since in the current example, the parent node 228 is associated with a minimum of a range, control passes through blocks 302 and 304 where the second bit position of the newly created node is set to zero.

Regardless of whether control advances through block 304 or block 306, control arrives at block 312. At block 312, the node placement engine 18 determines if its pointer is directed to an open spot on the tree or to another node. If the pointer points to an open spot, control returns to block 222 of FIG. 6C where the newly created node is placed on the tree as explained above. Otherwise, the data of the node on the tree that is currently pointed to by the node placement engine 18 is retrieved from that node's data structure (block 314) and control returns to block 262 (FIG. 6E) where the comparison of the property values of the newly created node and the next existing node is performed as explained above.

Figure 7D:
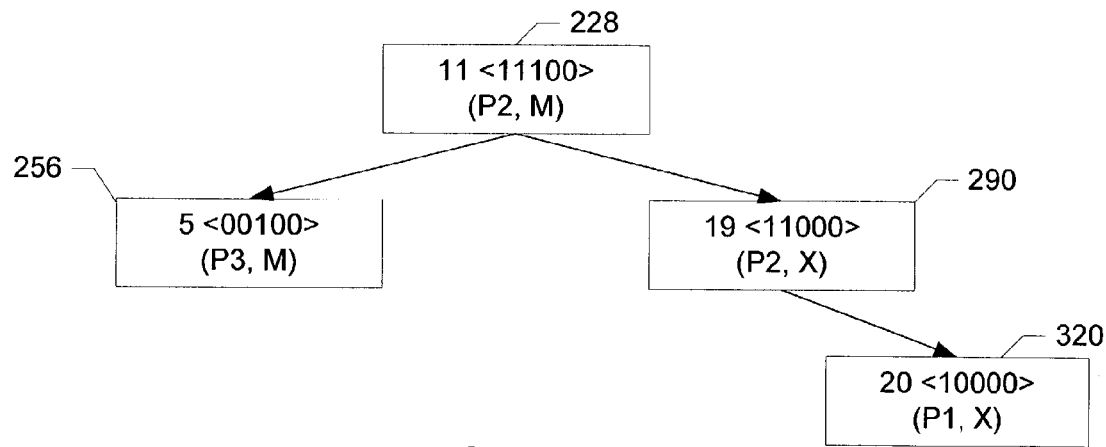

Since, in the current example, the pointer of the node placement engine 18 points to an occupied spot on the tree, namely, node 290 (block 312), control returns to block 262 where the above-described process is repeated using node 290 instead of node 228 as the parent node. In this example, control advances through blocks 262, 264, 270 and 274 of FIG. 6E and blocks 306, 308, 310 and 304 of FIG. 6H as explained above. Subsequently, a new node 320 is added to the tree as shown in FIG. 7D.

Continuing with the example of FIG. 7 and assuming that the next property value to be inserted is value 10 associated with policy P1, after proceeding through blocks 202-220 as explained above, control arrives at block 230 (FIG. 6B). Because, in this example, the property value 10 is a minimum of a range of property values, control advances from block 230 to block 234 of FIG. 6B. A comparison of the property value 10 of the current node and the property value of the first node 228 in the tree reveals that the current property value (i.e., 10) is less than the value (i.e., 11) of the existing node 228. Accordingly, the pointer of the placement engine 18 moves to the left of the node 228 (block 242, FIG. 6J), and the bit position corresponding to the routing policy of the newly created node (e.g., P1) is set to one in the parent node 228 (block 244). Because the parent node 228 is associated with a minimum value (block 246), the node value adjustor 20 sets the bit position associated with the policy (e.g., P2) of the parent node 228 to zero in the newly created node (block 248). Since the pointer of the node placement engine 18 now points to node 256 (block 252), the data of that node is retrieved (block 254) and control returns to block 234 of FIG. 6B.

With node 256 now the parent node, the property value (i.e., 10) of the newly created node is now greater than the property value (i.e., 5) of the parent node 256 (block 234). Accordingly, control advances to block 236 of FIG. 6D. At block 236, the pointer of the node placement engine 18 is moved to the right of the parent node. The bit position corresponding to the policy of the newly created node is then set to zero in the parent node (block 340).

If, as in the current example, the parent node (e.g., node 256) contains a property value that represents a minimum in a range of values (block 342), control advances to block 344 where the node value adjustor 20 sets the bit position corresponding to the policy (e.g., P3) associated with the parent node to one in the newly created node. Otherwise, if the parent node (e.g., node 256) contains a property value that does not represent a minimum in a range of values (block 342), the node value adjustor 20 sets the bit position corresponding to the policy associated with the parent node to zero in the newly created node (block 346).

Figure 7E:
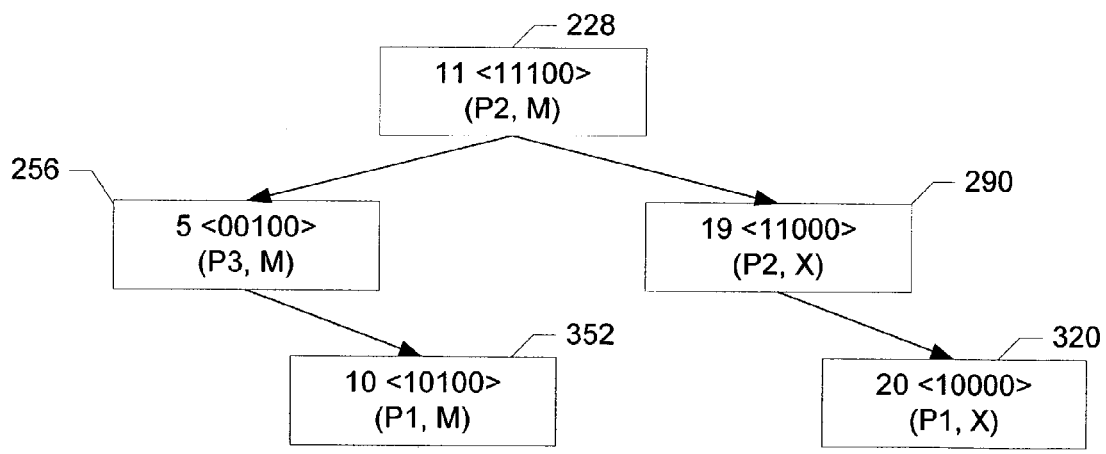

Regardless of whether control advances through block 344 or block 346, control arrives at block 348. At block 348, the node placement engine 18 determines if its pointer is directed to an open spot on the tree or to another node. If the pointer points to an open spot, control returns to block 222 of FIG. 6C where the newly created node is placed on the tree as explained above. Otherwise, the data of the node on the tree that is currently pointed to by the node placement engine 18 is retrieved from that node's data structure (block 350) and control returns to block 234 (FIG. 6B) where the comparison of the property values of the nodes are performed as explained above. Since, in the current example, the pointer of the node placement engine 18 points to an unoccupied spot on the tree (block 348), control returns to block 222 where a new node 352 is added to the tree as shown in FIG. 7E.

Continuing with the example of FIG. 7 and assuming that the next property value to be inserted is value 10 associated with policy P4, after proceeding through blocks 202-220 as explained above, control arrives at block 230 (FIG. 6B). Because the property value of the newly created node is a maximum, control advances to block 232 of FIG. 6I. Control then proceeds through blocks 262, 266, 268, 270, and 274 of FIG. 6I as explained above. Control then further proceeds through blocks 300-304, 312 and 314 of FIG. 6H such that node 256 becomes the parent node.

With node 256 now the parent node, control proceeds through blocks 202-230, blocks 232, 262, 264, 274, 300-304, 312 and 314 as explained above. As a result, node 352 becomes the parent node and control again loops through blocks 200-204, 208, 220, 230 and 234. However, at block 238 (FIG. 6B), the property value of the newly created node (i.e., 10) is equal to the property value of the parent node 352. Accordingly, control advances to block 240 of FIG. 6G.

Figure 7F:
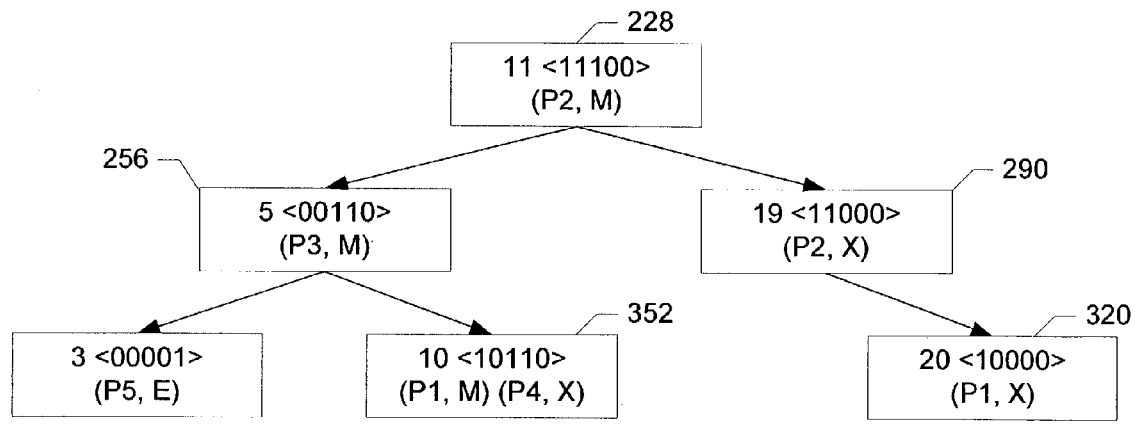

At block 240, a process of merging the newly created node and the parent node is commenced because the two nodes are associated with the same property value (i.e., 10). In particular, an indicator of the policy of the newly created node (i.e., P4) and an indicator of the property value's relation to that policy (e.g., a maximum of a range of values, a minimum of a range of values, or a single values) are added to the parent node as shown in FIG. 7F. A logical OR operation is then performed on the bit vector of the parent node and the bit vector of the newly created node to create the bit vector for the merged node 352 (block 370). Control then returns to block 216.

Continuing with the example of FIG. 7 and assuming that the next property value to be inserted is value 3 associated with policy P5, after proceeding through blocks 202-220 as explained above, control arrives at block 230 (FIG. 6B). Because the property value is a single value (block 230), control advances to block 232 of FIG. 6E. Because the property value is not a maximum of a range of values (block 232), control advances from block 232 to block 260 of FIG. 6F.

At block 260, the node placement engine 18 determines if the property value of the newly created node is equal to the property value of the parent node. If so, control advances to block 240 of FIG. 6G. Otherwise, control advances to block 380 of FIG. 6F.

Since, in this example, the property value of the newly created node (i.e., 3) is not equal to the property value of the parent node 228 (block 260), control advances to block 380. No bits in the bit vector of a parent node are changed by a single value node (block 380). However, the bit position of the policy of the parent node is set to zero in the single value node (block 382). Control then advances to block 384.

At block 384, the property value of the newly created node is compared to the property value of the parent node. In keeping with the convention mentioned above, if the property value of the newly created node exceeds the property value of the parent node, the pointer of the node placement engine 18 is moved to the right (block 386). Otherwise, the pointer of the node placement engine 18 is moved to the left (block 388).

Figure 7G:
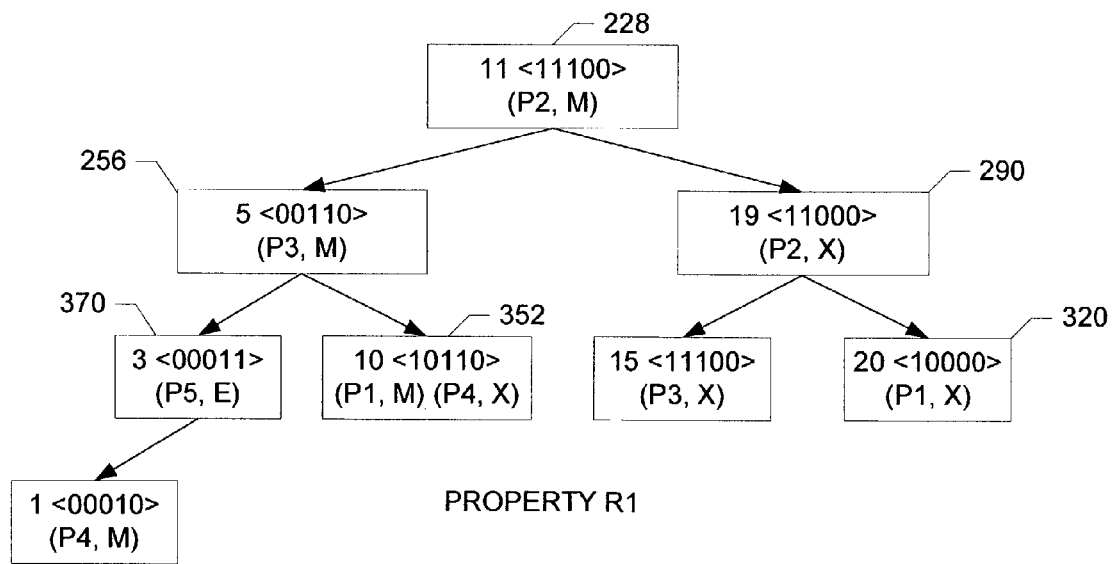

Irrespective of whether control proceeds though block 386 or 388, control arrives at block 390. At block 390, the node placement engine 18 determines if its pointer is directed to an open spot on the tree or to another node. If the pointer points to an open spot, control returns to block 222 of FIG. 6C where the newly created node is placed on the tree as explained above. Otherwise, the data of the node on the tree that is currently pointed to by the node placement engine 18 is retrieved from that node's data structure (block 392) and control returns to block 260 (FIG. 6F). Control continues to loop through blocks 260, and 380-392 until a vacant location for the newly created node is identified on the tree (block 390), or until a requirement to merge the newly created node with an existing node is detected (block 260). In the instant example, the newly created node is added to the tree as shown in FIG. 7G.

Once all of the nodes have been placed on the tree (block 216 of FIG. 6C), the construct tree routine terminates. Example binary trees for the properties R1 and R2 of FIG. 2 are shown in FIGS. 7G and 8.

Once the binary trees are created and propagated throughout the network, the routers/gateways employ the trees to decide how to route packets. An example program that may be executed by a router or gateway to routing packets in a policy driven network is shown in FIG. 9.

Figure 9:
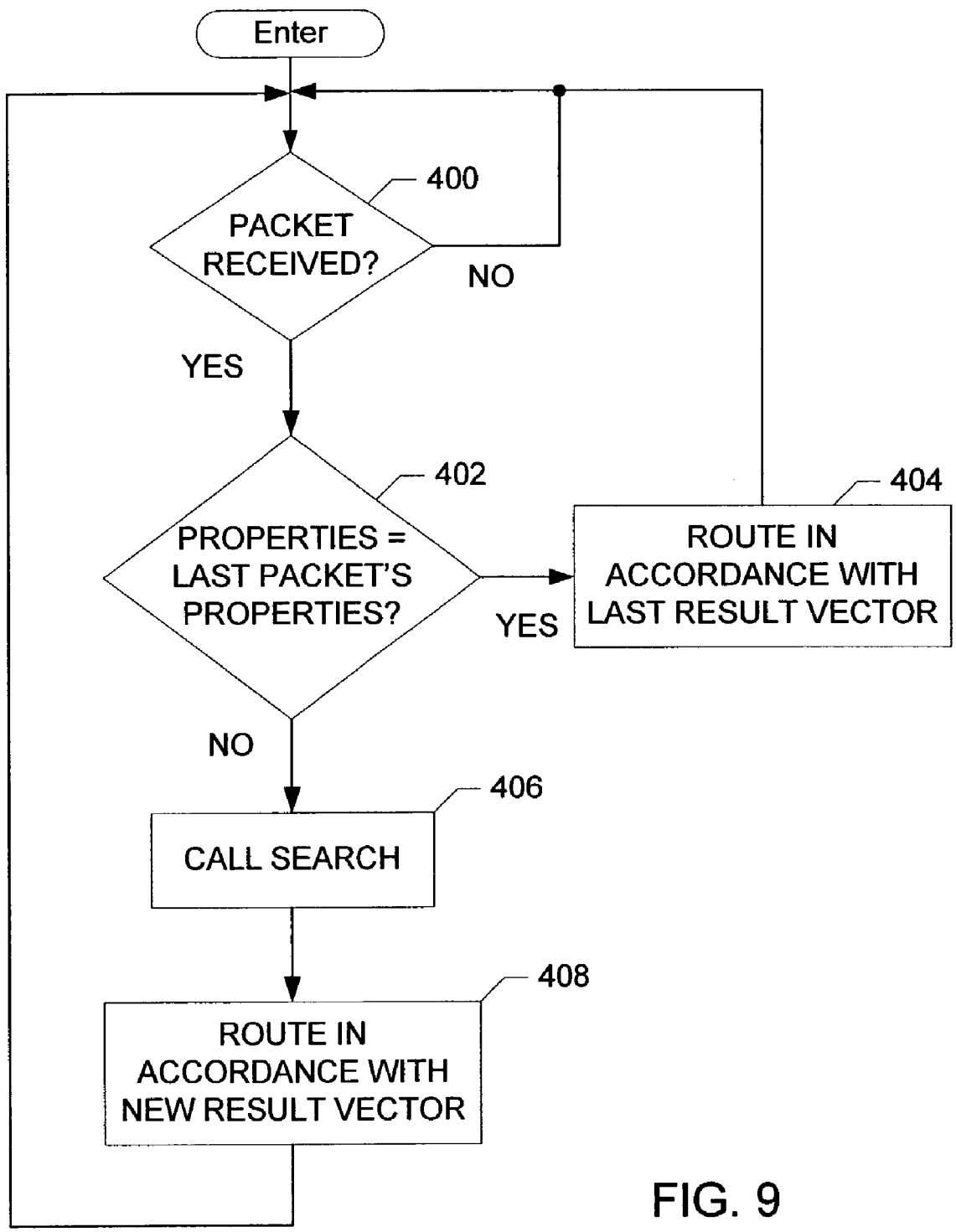
FIG. 9 is a flowchart illustrating an example program which may be used to implement the search engine and routing engine of FIG. 1.

The program of FIG. 9 begins at block 400. When a packet is received (block 400), control advances to block 402 where the router/gateway determines if the property values appearing in the header of the received packet for the routing driving properties are the same as the corresponding property values for the last received packet. If the two sets of properties are the same (block 404), the received packet is routed in accordance with the policy or policies that were used to route the proceeding packet (block 404) and control then returns to block 400 to await receipt of the next packet.

If the two sets of properties are not the same (block 404), the router/gateway calls a search routine to search the binary trees to identify the routing property or properties to be used to route the received packet (block 406). An example search routine is shown in FIGS. 10A-10E and will be discussed in detail below. For now, suffice it to say that the search routine returns a result vector for the packet in question (block 406). The router/gateway then routes the packet in accordance with the policies specified in the result vector (block 408). For instance, the router/gateway reviews the bit positions of the result vector to determine which, if any, are set to true. The polic(ies) corresponding to the bit positions set to true are then retrieved and used to route the packet. Control then returns to block 400 to await receipt of the next packet.

An example search routine will now be explained in connection with FIGS. 10A-10E. For simplicity, the example search routine will be explained assuming that the binary trees shown in the FIGS. 7G and 8 are the only binary trees used in the network, but persons of ordinary skill in the art will readily appreciate that more than two binary trees and/or different trees than those shown in FIGS. 7G and 8 will likely be used depending on the network policies being implemented.

Figure 10A:
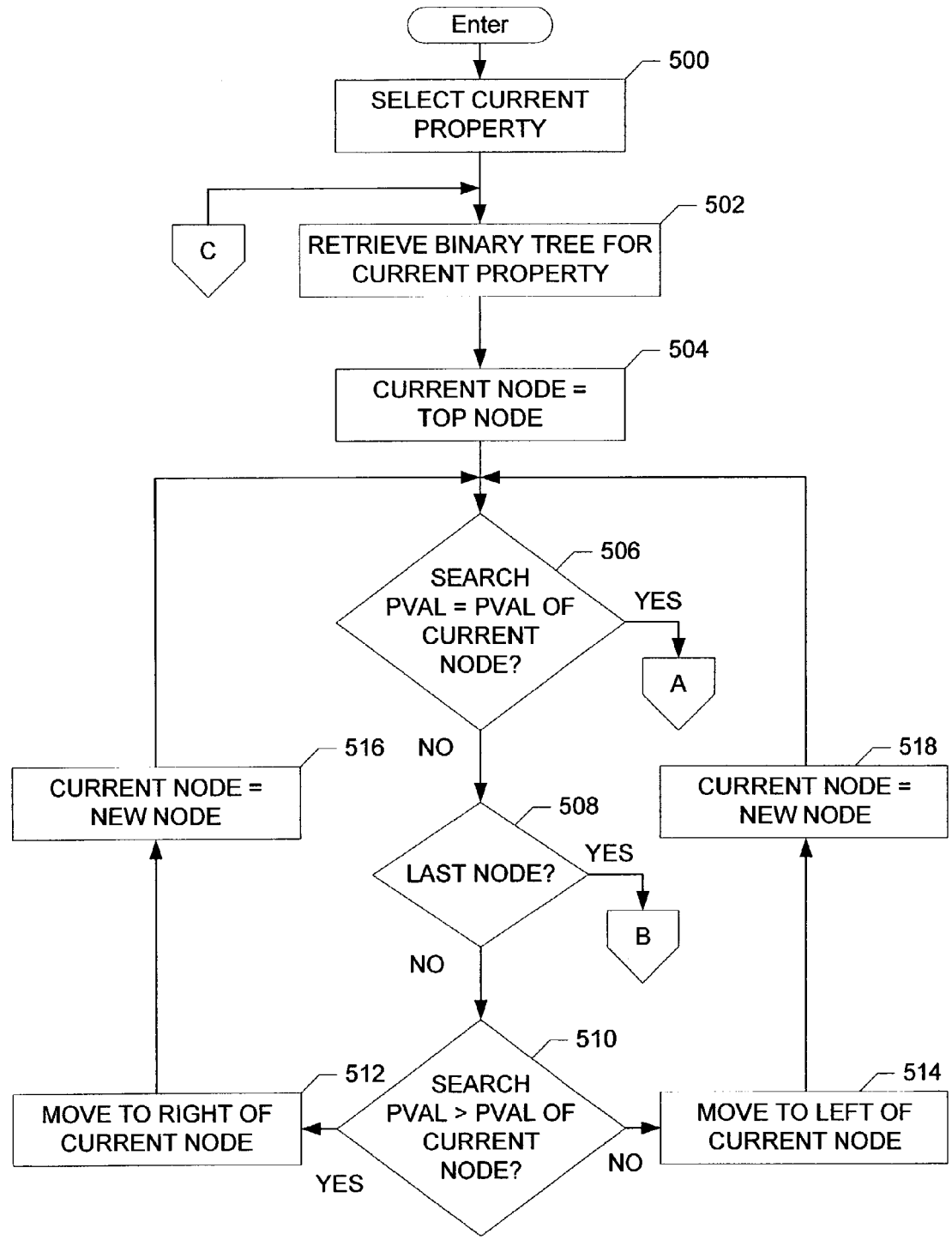
FIGS. 10A-10E are a flowchart illustrating an example search routine that may be called by the program of FIG. 9.

The example program of FIG. 10A begins at block 500 where the tree searcher 34 selects a property (e.g., property R1 or property R2) with which to begin the search. The selection of the property may be random or may be done in a predefined sequence. Irrespective of the methodology used to select the property, selecting the property may include retrieving the value for the selected property from the header of the packet requiring routing.

As stated above, each of the properties that may invoke a routing policy is associated with a binary tree. The tree reflects the relationship(s) between the values required of that property to invoke the various routing policies. Therefore, selecting a property at block 500 has the effect of selecting a binary tree to search. Thus, after the property is selected (block 500), the binary tree associated with the selected property is retrieved from memory or otherwise made available for searching (block 502).

The current node is then defined to be the top node in the retrieved binary tree (block 504) and the property value being searched (i.e., the value retrieved from the packet header corresponding to the selected property) is compared to the property value of the current node (block 506). If the property value from the header of the packet is equal to the property value of the current node (e.g., the top node in the retrieved tree) (block 506), control advances to block 520 of FIG. 10B. Otherwise, control advances to block 508 of FIG. 10A.

Assuming, for purposes of discussion, that the property value being searched is not exactly matched by the current node (block 506), control advances to block 508. At block 508, the tree searcher 34 determines if there is another node on the tree lower than the current node. If there are no lower nodes connected to the current node, control advances to block 550. Otherwise, control advances to block 510.

At block 510, the tree searcher 34 determines whether the property value being searched (i.e., the property value retrieved from the header of the packet requiring routing) is greater than the property value of the current node. If so, the pointer of the tree searcher 34 is moved to the right of the current node (block 512). If not, the pointer of the tree searcher 34 is moved to the left of the current node (block 514). The node pointed to by the pointer of the tree searcher 34 then becomes the current node (block 516 or 518) and control returns to block 506 where the comparison between the property value of the packet and the new current node is repeated in an effort to identify a match.

Control continues to loop through blocks 506-518 until an exact match is found between the property value of the packet being searched and a property value of a node on the tree (block 506), or until the pointer of the tree searcher 34 reaches a node at the bottom of the tree and can move no further down the tree (block 508).

Figure 10B:
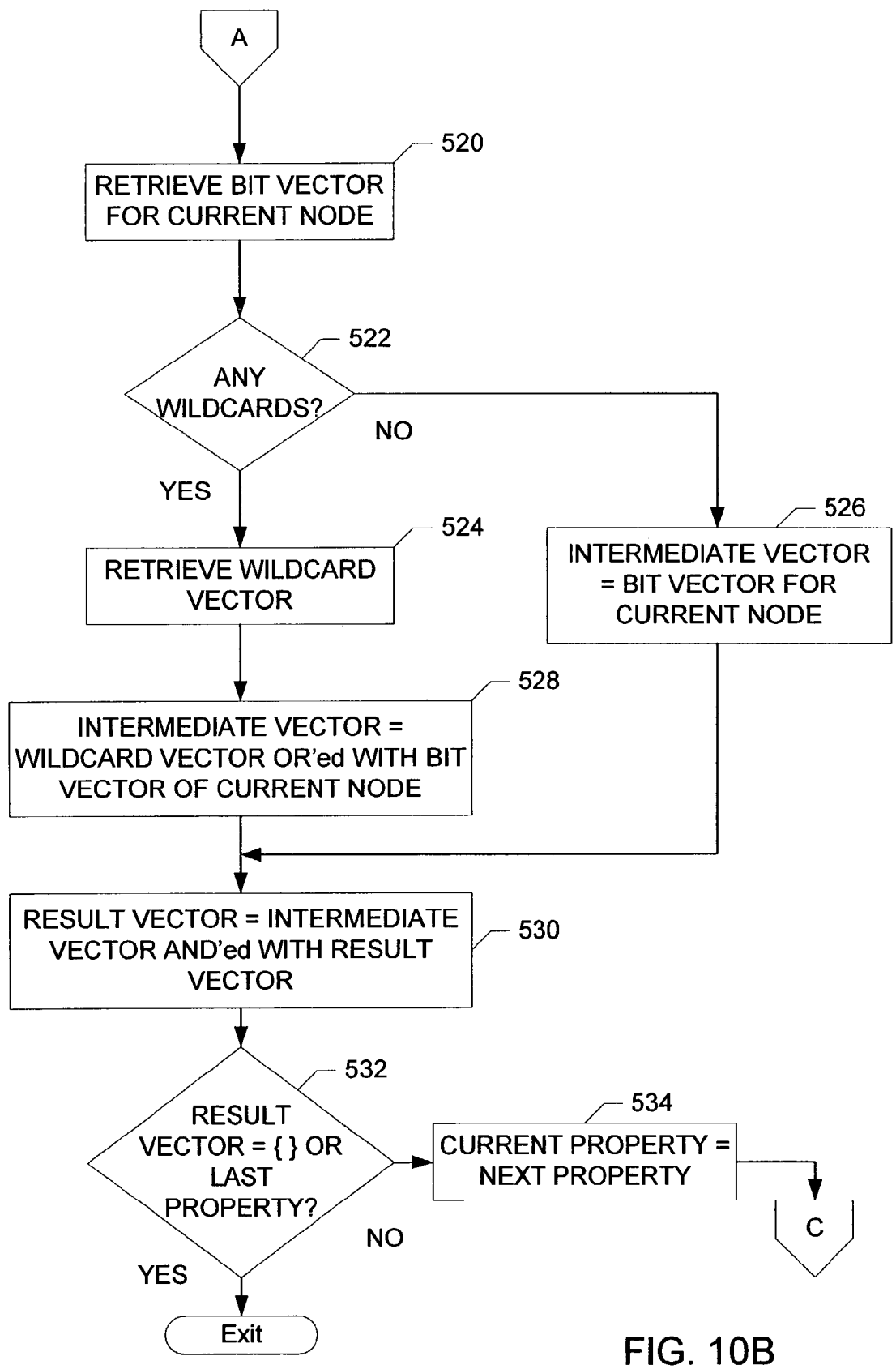

Assuming, for purposes of discussion that an exact match of the property value retrieved from the packet header has been found (block 506), control proceeds to block 520 (FIG. 10B). At block 520, the vector processor 36 of the search engine 28 retrieves the bit vector of the node in the tree having the matching property value. The wildcard adjustor 38 then determines if there is a wildcard vector associated with the binary tree being searched by, for example, examining the state of a wildcard flag associated with the tree (block 522). If there are no such wildcard vectors (block 522), control advances to block 526 where an intermediate vector is set equal to the bit vector retrieved from the current node with the matching property value. If there is a wildcard vector associated with the binary tree (block 522), the wildcard vector is retrieved (block 524), and the intermediate vector is set equal to the logical OR of the retrieved wildcard vector and the bit vector retrieved from the node with the matching property value (block 528).

Irrespective of whether control passes through blocks 528 or block 526, control arrives at block 530. At block 530, the result compiler 40 sets a result vector equal to the logical AND of the intermediate vector developed from the current binary tree and the current value of the result vector. This logical AND operation is performed to find the intersection between the bit vectors retrieved from the various binary trees. In the instance of searching the first binary tree for a given packet, the result vector's bits will all be initially set to one such that the logical AND operation performed at block 530 simply sets the result vector equal to the intermediate vector. In all subsequent performances of the logical AND operation of block 530 for the same packet, the result vector will reflect a composite vector corresponding to the intersection of the vectors retrieved for the packet. The intersection may, of course, be an empty set such that all of the bits of the result vector are set to zero.

After the logical AND operation is performed to update the result vector (block 530), control advances to block 532. At block 532, the result compiler 40 determines whether all of the bits of the result vector are set equal to zero and/or the tree searcher 28 determines if the last property that may invoke a routing policy has been searched. If all of the bit positions of the result vector are set to zero, then the AND operation performed at block 530 will always result in a vector with zeros in all bit positions. Accordingly, there is no reason to search the remaining binary trees for the bit vectors corresponding to the remaining (as yet unsearched) packet properties and the search routine terminates with no routing policies identified as invoked by the packet. Alternatively, if the tree searcher 28 determines that all of the trees corresponding to the packet properties have been searched (block 532), the search routine terminates so the result vector can be reviewed for any invoked routing policies.

If the result vector has at least one bit position set to true and the last packet property has not yet been searched (block 532), control proceeds to block 534. At block 534, the next property to be searched is retrieved from the packet. Control then returns to block 502 (FIG. 10A) where the binary tree corresponding to the next property is retrieved and the searching of the newly retrieved tree proceeds as explained above. Control continues to loop through blocks 502-534 until the result vector has every bit position set to false or the binary trees corresponding to every packet property that may invoke a routing policy have all been searched (block 532). The search routine then returns the result vector and terminates such that control returns to block 408 of FIG. 9.

Figure 10C:
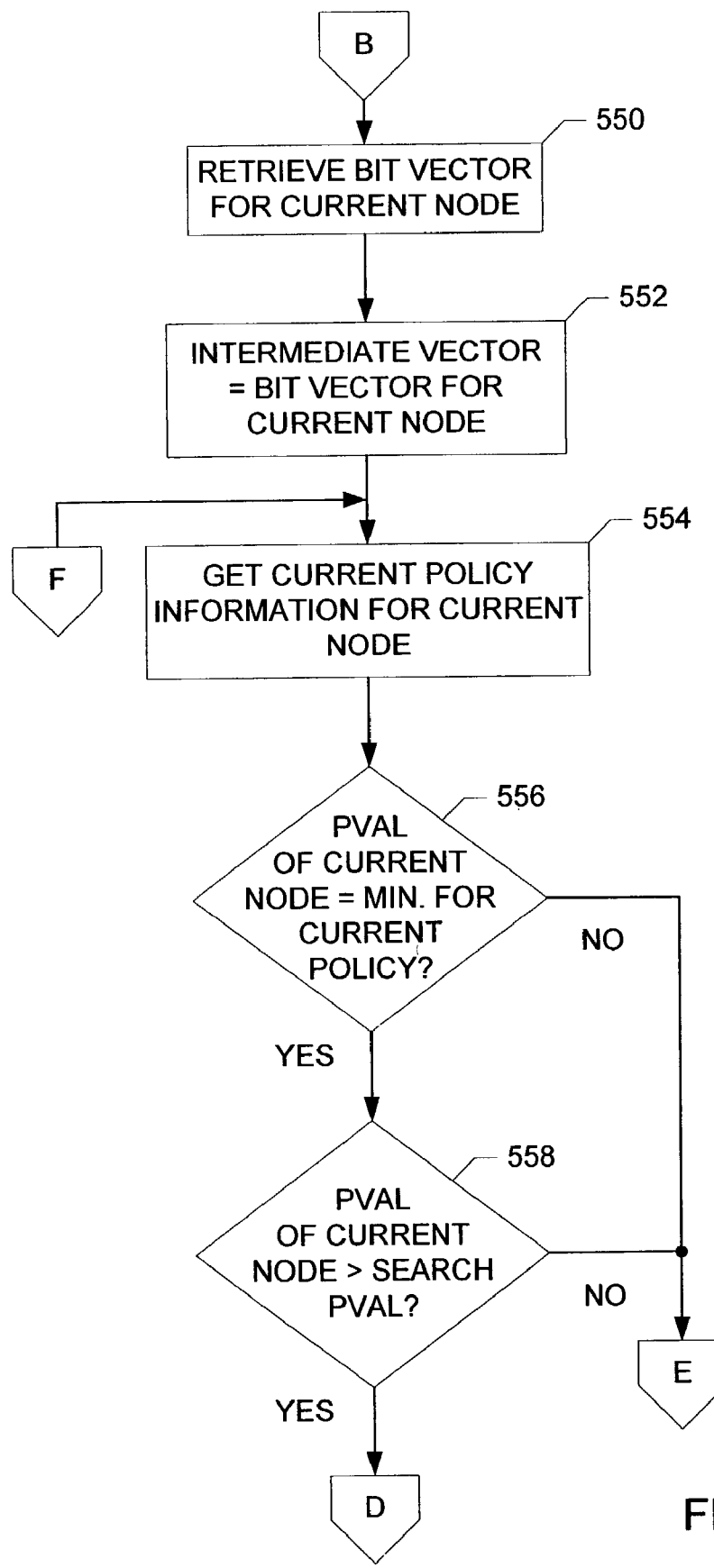

Assuming for purposes of discussion that the search for a particular property value in a binary tree does not result in an exact match (block 506, FIG. 10A), but instead terminates at a node at the bottom of a tree (block 508), control advances to block 550 of FIG. 10C. At block 550, the vector processor 36 retrieves the bit vector from the last node examined by the tree searcher 34. The intermediate vector is then set equal to the bit vector retrieved by the vector processor 36 (block 552) and the policy information (e.g., minimum, maximum, or single value) for one of the policies associated with the last node examined by the tree searcher 34 (if multiple policies are present in the node (see node 352 of FIG. 7G)) is retrieved (block 554).

Figure 10D:
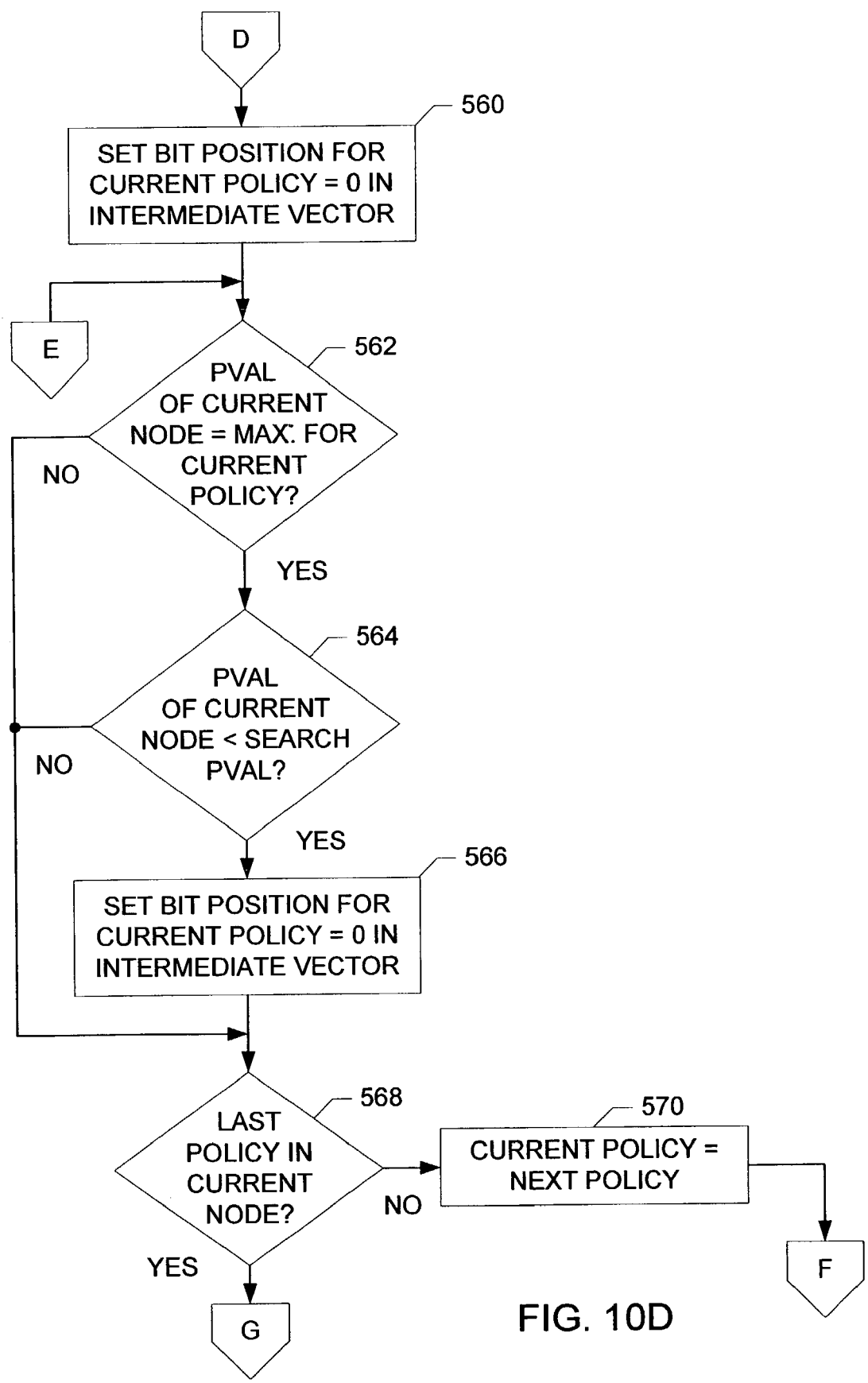

The vector processor 36 then determines if the property value of the last examined node is a minimum of a value range for the retrieved policy (block 556). If so, control proceeds to block 558. Otherwise, control advances to block 562 (FIG. 10D).

Assuming for purposes of discussion that the property value of the last examined node is a minimum value of a property range for the retrieved policy (block 556), the vector processor 36 then determines if the property value of the last examined node is greater than the property value that is being searched (block 558). If not, control advances to block 562 (FIG. 10D). Otherwise, if the property value of the last examined node is greater than the property value that was being searched (block 558), control advances to block 560 (FIG. 10D) where the bit position corresponding to the policy retrieved from the last examined node is set to zero in the intermediate vector. Control then proceeds to block 562.

Irrespective of whether control arrives at block 562 from block 556, 558, or 560, at block 562 the vector processor 36 determines if the property value of the last examined node is a maximum of a value range for the retrieved policy (block 562). If not, control proceeds to block 568. Otherwise, control advances to block 564.

Assuming for purposes of discussion that the property value of the last examined node is a maximum value of a property range for the retrieved policy (block 562), the vector processor 36 then determines if the property value of the last examined node is less than the property value that was being searched (block 564). If not, control advances to block 568. Otherwise, if the property value of the last examined node is less than the property value that was being searched (block 564), control advances to block 566 where the bit position corresponding to the policy retrieved from the last examined node is set to zero in the intermediate vector. Control then proceeds to block 568.

Figure 10E:
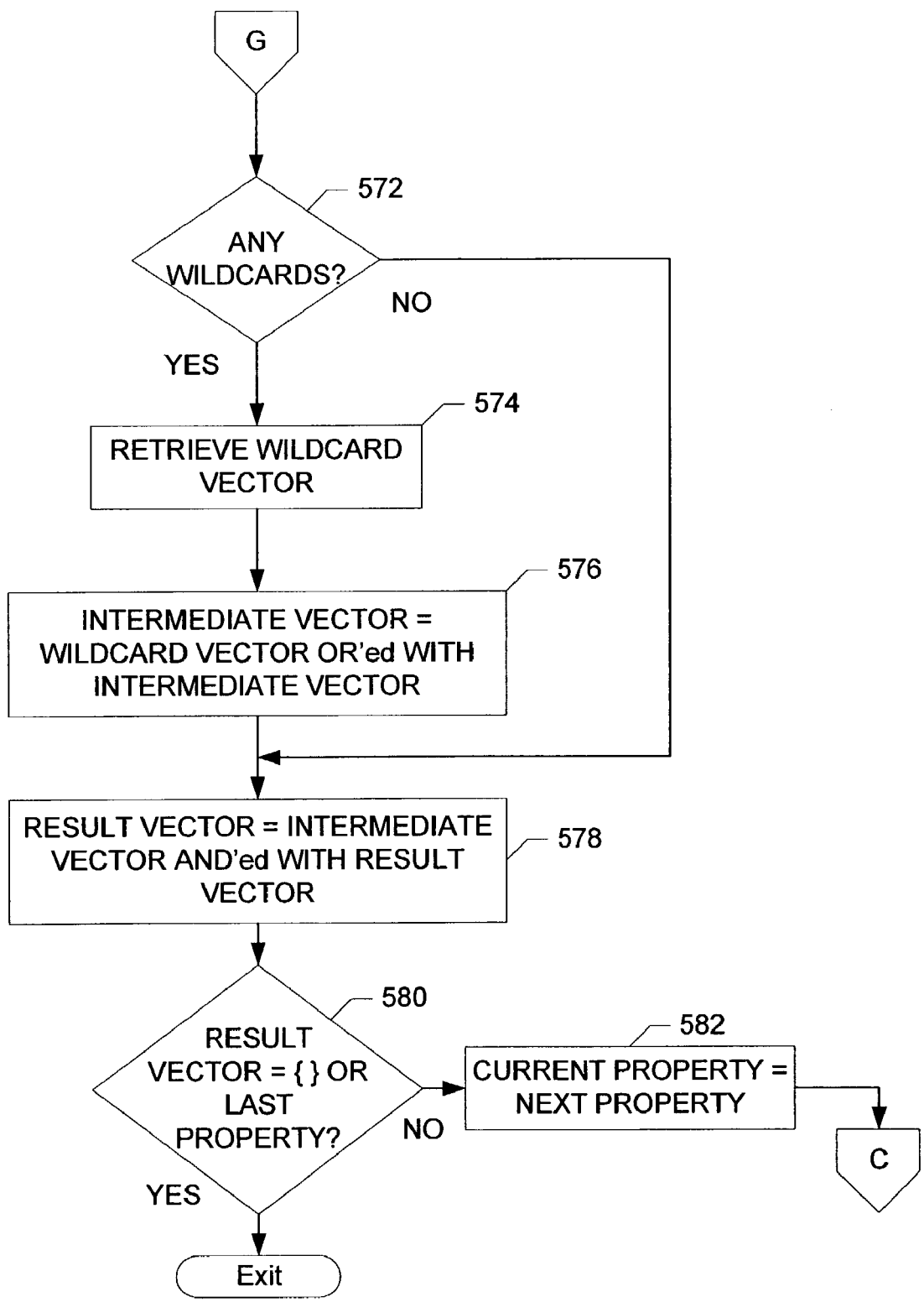

Irrespective of whether control arrives at block 568 from block 562, 564, or 566, at block 568 the vector processor 36 determines if the last examined node is associated with another policy that has not yet been used by the vector adjuster 36 to consider adjusting the intermediate vector. If there is another policy to consider (block 568), the policy information for the next policy is retrieved (block 570), and control returns to block 554 (FIG. 10C). Control continues to loop through blocks 554-570 until every policy associated with the last examined node has been considered for possibly adjusting the intermediate vector (block 568). Once every policy of the last examined node has been so considered (block 568), control advances to block 572 (FIG. 10E).

At block 572, the wildcard adjustor 38 determines whether there are any wildcards associated with the current binary tree. If so, control advances to block 574. Otherwise, control proceeds to block 578.

Assuming for purposes of discussion that there is a wildcard vector associated with the binary tree (see, for example, FIG. 8), the wildcard adjustor 38 retrieves the wildcard vector (block 574). It then performs a logical OR operation on the intermediate vector and the retrieved wildcard vector (block 576). Control then advances to block 578.

Irrespective of whether control reaches block 578 from block 572 or block 576, at block 578 the result compiler 40 sets a result vector equal to the logical AND of the intermediate vector developed from the current binary tree and the current value of the result vector. This logical AND operation is performed to find the intersection (if any) between the bit vectors retrieved from the various binary trees. In the instance of searching the first binary tree for a given packet, the result vector's bits will all be initially set to one such that the logical AND operation performed at block 578 simply sets the result vector equal to the intermediate vector. In all subsequent performances of the logical AND operation of block 578 for the same packet, the result vector will reflect a composite vector corresponding to the intersection of the vectors retrieved for the packet. The intersection may, of course, be an empty set such that all of the bits of the result vector are set to zero.

After the logical AND operation is performed to update the result vector (block 578), control advances to block 580. At block 580, the result compiler 40 determines whether all of the bits of the result vector are set equal to zero and/or the tree searcher 28 determines if the last property that may invoke a routing policy has been searched. If all of the bit positions of the result vector are set to zero, then the AND operation performed at block 578 will always result in a vector with zeros in all bit positions. Accordingly, there is no reason to search the remaining binary trees for the bit vectors corresponding to the remaining (as yet unsearched) packet properties and the search routine terminates with no routing policies identified as invoked by the packet. Alternatively, if the tree searcher 28 determines that all of the trees corresponding to the packet properties have been searched (block 578), the search routine terminates so the result vector can be reviewed for any invoked routing policies.

If the result vector has at least one bit position set to true and the last packet property has not yet been searched (block 580), control proceeds to block 582. At block 582, the next property to be searched is retrieved from the packet. Control then returns to block 502 (FIG. 10A) where the binary tree corresponding to the next property is retrieved and the searching of the newly retrieved tree begins as explained above. Control continues to loop through blocks 502-582 until the result vector has every bit position set to false or the binary tree corresponding to every packet property that may invoke a routing policy has been completely searched (block 580). The search routine then returns the result vector and terminates such that control returns to block 408 of FIG. 9.

Figure 11:
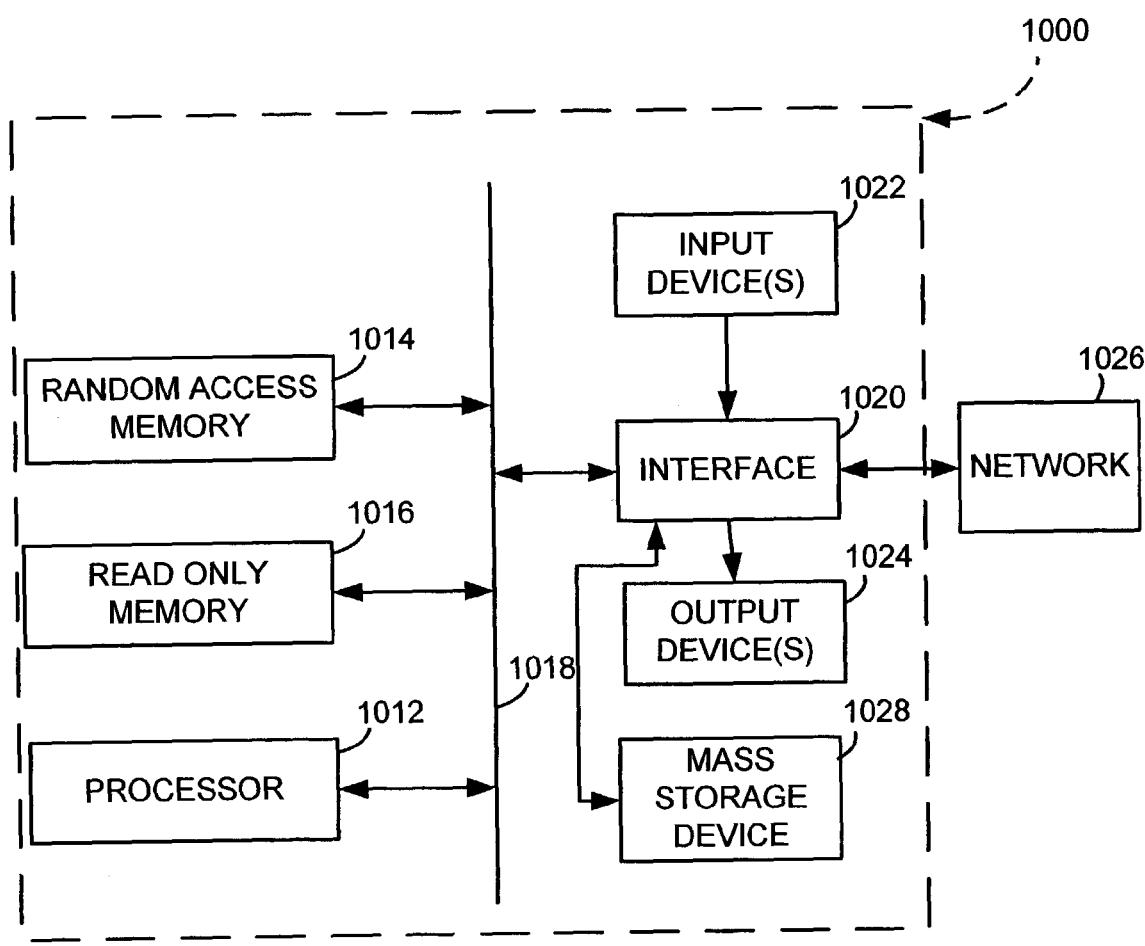
FIG. 11 is a schematic illustration of an example computer that may be used to execute the programs of FIGS. 5, 6A-6J, 9 and 10A-10E to implement the apparatus of FIG. 1.

FIG. 11 is a block diagram of an example computer 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012. For example, the processor 1012 can be implemented by one or more Intel® microprocessors from the Pentium® family, the Itanium® family or the XScale® family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., communication device 56) such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the local storage device 62.

From the foregoing, persons of ordinary skill in the art will appreciate that the above disclosed methods and apparatus permit fast and efficient identification of the routing policies used to route a packet. The search time for each property is O (Log N), where N is the number of values in the property tree. Since the bit vectors for each property are then AND'ed to create a final bit vector, the total search time is O (X Log N), where X is the number of properties to be matched.

Since each node in a property tree stores a bit vector which has a length (M) equal to the number of policies being matched, the storage complexity for the bit vectors is XMN bits or XMN/8000 kilobytes (KB), where M is the number of policies to be matched, N is the number of nodes per tree, and X is the number of trees (or properties) that exist. For the worst case, if all properties are ranges and no properties overlap (i.e., no minimum, maximum or single values in a chart such as the chart of FIG. 2 are the same), the above equation translates into XM(2M)/8000 KB or XM2/4000 KB. For example, for a set of 1000 policies with quintuple matching (i.e., five policy triggering properties), the worst case amount of space used by the vector database is 1250 KB (i.e., 5(1000)2/4000 KB).

The total number of word sized memory accesses to arrive at the final result vector is XM/W, where W is the word size of the architecture executing the program.

By using specialized hardware to run the search for each property's bit vector in a different thread, and then using separate threads to compute batch AND operations in parallel, the illustrated approach may be optimized to clamp the worst case matching behavior to an upper bound of O (Log N) instead of O (X Log N), where X is the number of properties to classify.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. method of routing a packet of information in a networked environment comprising:
    using a first property value associated with the packet of information to identify a first bit vector;
    using a second property value associated with the packet of information to identify a second bit vector;
    identifying at least one routing policy based on the first and second bit vectors; and
    representing a wildcard policy by a bit vector, wherein identifying the at least one routing policy comprises:
    performing a logical OR operation on (a) the bit vector representing the wildcard policy and (b) an intersection of the first and second bit vectors; and
        identifying the at least one routing policy from a bit vector resulting from the logical OR operation.

2. A method as defined in claim 1 wherein each bit position in the first bit vector is associated with a respective routing policy.

3. A method as defined in claim 2 further comprising representing relationships between a plurality of properties and a plurality of routing policies with a plurality of bit vectors including the first and second bit vectors by creating a binary tree for each of the properties.

4. A method as defined in claim 2 wherein using the first property value to identify the first bit vector comprises using the first property value to search a binary tree associated with a first property.

5. A method as defined in claim 4 wherein the binary tree comprises a plurality of nodes, each of the nodes having an associated bit vector.

6. A method as defined in claim 5 wherein each of the nodes is associated with at least one of a routing policy and a property value.

7. A method as defined in claim 6 wherein each of the property values comprises at least one of a maximum value in a range of property values, a minimum value in a range of property values, and a single property value.

8. A method as defined in claim 1 wherein the intersection of the first and second bit vectors is determined by performing a logical AND operation on the first and second bit vectors.

9. A method as defined in claim 1 further comprising routing the packet in accordance with the at least one routing policy.

10. A method of routing a packet of information in a networked environment comprising:

representing relationships between a plurality of properties and a plurality of routing policies with a plurality of bit vectors;

identifying a first property value associated with the packet and a second property value associated with the packet;

selecting a first bit vector from the plurality of bit vectors based on the first property value;

selecting a second bit vector from the plurality of bit vectors based on the second property value;

determining an intersection of the first and second bit vectors;

identifying at least one of the plurality of routing policies to be used to route the packet based on the intersection of the first and second bit vectors; and representing a wildcard policy by a bit vector, wherein identifying the at least one of the plurality of routing policies to be used to route the packet based on the intersection of the first and second bit vectors comprises:

performing a logical OR operation on (a) the bit vector representing the wildcard policy and (b) the intersection of the first and second bit vectors; and identifying the at least one of the plurality of routing policies from a bit vector resulting from the logical OR operation.

11. An computer readable medium storing machine readable instructions which, when executed, cause a machine to:

use a first property value associated with a packet of information to identify a first bit vector;

use a second property value associated with the packet of information to identify a second bit vector;

identify at least one routing policy from the first and second bit vectors for routing the packet of information in a networked environment; and represent a wildcard policy by a bit vector, wherein the machine readable instructions further cause the machine to identify the at least one routing policy by:

performing a logical OR operation on (a) the bit vector representing the wildcard policy and (b) an intersection of the first and second bit vectors; and identifying the at least one routing policy from a bit vector resulting from the logical OR operation.

12. A method of identifying at least one routing policy applicable to a packet of information comprising:

identifying a first property value associated with a first property and a second property value associated with a second property, the first and second property values being associated with the packet of information;

searching a first binary tree associated with the first property to retrieve a first bit vector associated with the first property value;

searching a second binary tree associated with the second property to retrieve a second bit vector associated with the second property value; and identifying at least one routing policy based on the first and second bit vectors.

13. A method as defined in claim 12 wherein identifying the first property value and the second property value comprises examining a header associated with the packet of information.

14. A method as defined in claim 13 wherein the header is an IP header.

15. A method as defined in claim 12 wherein searching the first binary tree comprises comparing the first property value to at least one property value in at least one node of the first binary tree.

16. A method as defined in claim 15 further comprising:

if comparing the first property value to the at least one property value in at least one node of the first binary tree identifies a matching node having exactly the first property value, retrieving a bit vector from the matching node as the first bit vector.

17. A method as defined in claim 16 further comprising:

determining if a wildcard vector is associated with the first binary tree; and if a wildcard vector is associated with the first binary tree, performing a logical OR operation with the first bit vector and the wildcard vector to produce a first result vector.

18. A method as defined in claim 17 wherein identifying at least one routing policy based on the first and second bit vectors further comprises, performing a logical AND operation on the first result vector and the second bit vector.

19. A method as defined in claim 17 wherein identifying at least one routing policy based on the first and second bit vectors further comprises, performing a logical AND operation on the first result vector and a second result vector, the second result vector being developed by performing a logical OR operation with the second bit vector and a wildcard vector.

20. A method as defined in claim 15 further comprising:

if comparing the first property value to the at least one property value in at least one node of the first binary tree identifies an inexactly matching node having a property value different from the first property value, retrieving a bit vector from the inexactly matching node as an intermediate vector;

if the property value of the inexactly matching node is a minimum range value for a policy, and if the property value of the inexactly matching node is larger than the first property value, retrieving a bit vector from the inexactly matching node as an intermediate vector and setting a bit in the intermediate vector associated with the policy to the second predetermined value; and if the property value of the inexactly matching node is a maximum range value for a policy, and if the property value of the inexactly matching node is smaller than the first property value, retrieving a bit vector from the inexactly matching node as an intermediate vector and setting a bit in the intermediate vector associated with the policy to the second predetermined value.

21. A method as defined in claim 20 further comprising:

determining if a wildcard vector is associated with the first binary tree; and if a wildcard vector is associated with the first binary tree, performing a logical OR operation with the intermediate vector and the wildcard vector to produce a first result vector.

22. A method as defined in claim 21 wherein identifying at least one routing policy based on the first and second bit vectors further comprises, performing a logical AND operation on the first result vector and the second bit vector.

23. A method as defined in claim 21 wherein identifying at least one routing policy based on the first and second bit vectors further comprises, performing a logical AND operation on the first result vector and a second result vector, the second result vector being developed by performing a logical OR operation on the second bit vector and a wildcard vector.

* * * * *

UNITED STATES PATENT AND TRADEMARK OFFICE
CERTIFICATE OF CORRECTION

PATENT NO. : 7,443,854 B2  Page 1 of 1
APPLICATION NO. : 10/405712
DATED : October 28, 2008
INVENTOR(S) : Ravi L. Sahita It is certified that error appears in the above-identified patent and that said Letters Patent is hereby corrected as shown below:

Col. 20, Line 22: should read --A method of routing a packet of information in a networked Signed and Sealed this Twenty-seventh Day of January, 2009

JOHN DOLL
*Acting Director of the United States Patent and Trademark Office*